US011971668B2

(12) United States Patent
Takayama et al.

(10) Patent No.: US 11,971,668 B2
(45) Date of Patent: Apr. 30, 2024

(54) ELECTROPHOTOGRAPHIC ROLLER, PROCESS CARTRIDGE AND ELECTROPHOTOGRAPHIC IMAGE FORMING APPARATUS

(71) Applicant: CANON KABUSHIKI KAISHA, Tokyo (JP)

(72) Inventors: Ryosuke Takayama, Shizuoka (JP); Hiroaki Komatsu, Shizuoka (JP); Koji Yatsu, Shizuoka (JP); Seiji Tsuru, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/296,646

(22) Filed: Apr. 6, 2023

(65) Prior Publication Data

US 2023/0333496 A1 Oct. 19, 2023

(30) Foreign Application Priority Data

Apr. 15, 2022 (JP) ................................ 2022-067493

(51) Int. Cl.
*G03G 15/08* (2006.01)
*G03G 21/00* (2006.01)

(52) U.S. Cl.
CPC ..... *G03G 15/0808* (2013.01); *G03G 21/0058* (2013.01)

(58) Field of Classification Search
None
See application file for complete search history.

(56) References Cited

U.S. PATENT DOCUMENTS 4,743,937 A * 5/1988 Martin ............... G03G 15/0806 399/284
5,057,871 A * 10/1991 Hirose ............... G03G 15/0815 399/284
5,076,201 A * 12/1991 Nishio .................... B29C 44/56 399/284
5,097,294 A * 3/1992 Nishio ............... G03G 15/0812 399/284
5,220,129 A * 6/1993 Nishio ............... G03G 15/0812 399/284
5,548,382 A * 8/1996 Koshi ............... G03G 15/0818 399/272
8,298,670 B2 10/2012 Muranaka
8,449,975 B2 5/2013 Hirakoso
9,023,465 B2 5/2015 Yamada
9,625,854 B2 4/2017 Koyanagi
9,811,021 B2 11/2017 Muranaka
(Continued)

FOREIGN PATENT DOCUMENTS

JP 2003-226773 A 8/2003
JP 2004-45656 A 2/2004
(Continued)

*Primary Examiner* — Sevan A Aydin
(74) *Attorney, Agent, or Firm* — VENABLE LLP

(57) ABSTRACT

An electrophotographic roller comprising a substrate and a foam layer on an outer peripheral surface of the substrate, the foam layer constituting an outer surface of the electrophotographic roller, the foam layer comprising cells each of which opens on the outer surface, and the foam layer having a zero-point charge measured using a standard carrier of 40 μC/g or more.

11 Claims, 9 Drawing Sheets

(56) References Cited

U.S. PATENT DOCUMENTS

| | | | | |
|---|---|---|---|---|
| 10,303,079 | B2 | 5/2019 | Utsuno | |
| 10,635,019 | B2 | 4/2020 | Doi | |
| 10,678,161 | B2 | 6/2020 | Tsuru | |
| 10,884,352 | B2 | 1/2021 | Yamada | |
| 10,969,709 | B2 | 4/2021 | Arimura | |
| 10,996,581 | B2 | 5/2021 | Muranaka | |
| 11,022,904 | B2 | 6/2021 | Arimura | |
| 11,112,718 | B2 | 9/2021 | Uno | |
| 11,169,464 | B2 | 11/2021 | Komatsu | |
| 2008/0019729 | A1* | 1/2008 | Hoshio | G03G 15/0225 399/176 |
| 2008/0069599 | A1 | 3/2008 | Nakamura | |
| 2014/0119757 | A1* | 5/2014 | Yoshida | G03G 15/065 399/55 |
| 2015/0037062 | A1* | 2/2015 | Shibuya | G03G 15/161 399/101 |
| 2015/0110526 | A1* | 4/2015 | Tanaka | G03G 15/0874 399/262 |
| 2019/0094754 | A1* | 3/2019 | Hayashi | G03G 21/18 |
| 2020/0292960 | A1* | 9/2020 | Suzuki | G03G 21/12 |
| 2021/0048773 | A1* | 2/2021 | Macias Guzman | G03G 15/11 |
| 2021/0382430 | A1* | 12/2021 | Funatani | G03G 15/0808 |
| 2023/0161275 | A1* | 5/2023 | Uno | G03G 15/0233 430/60 |

FOREIGN PATENT DOCUMENTS

| | | | |
|---|---|---|---|
| JP | 2008-70671 | A | 3/2008 |
| JP | 2009-217035 | A | 9/2009 |

* cited by examiner

Fig.10A
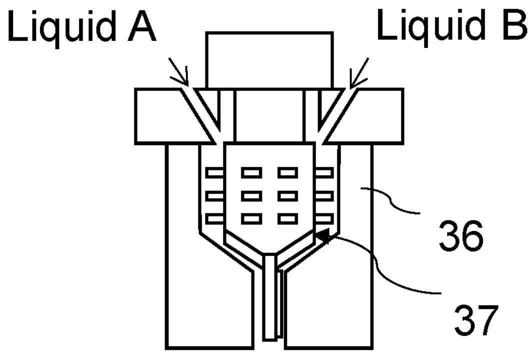
Fig.10B
Fig.10C
Fig.10D
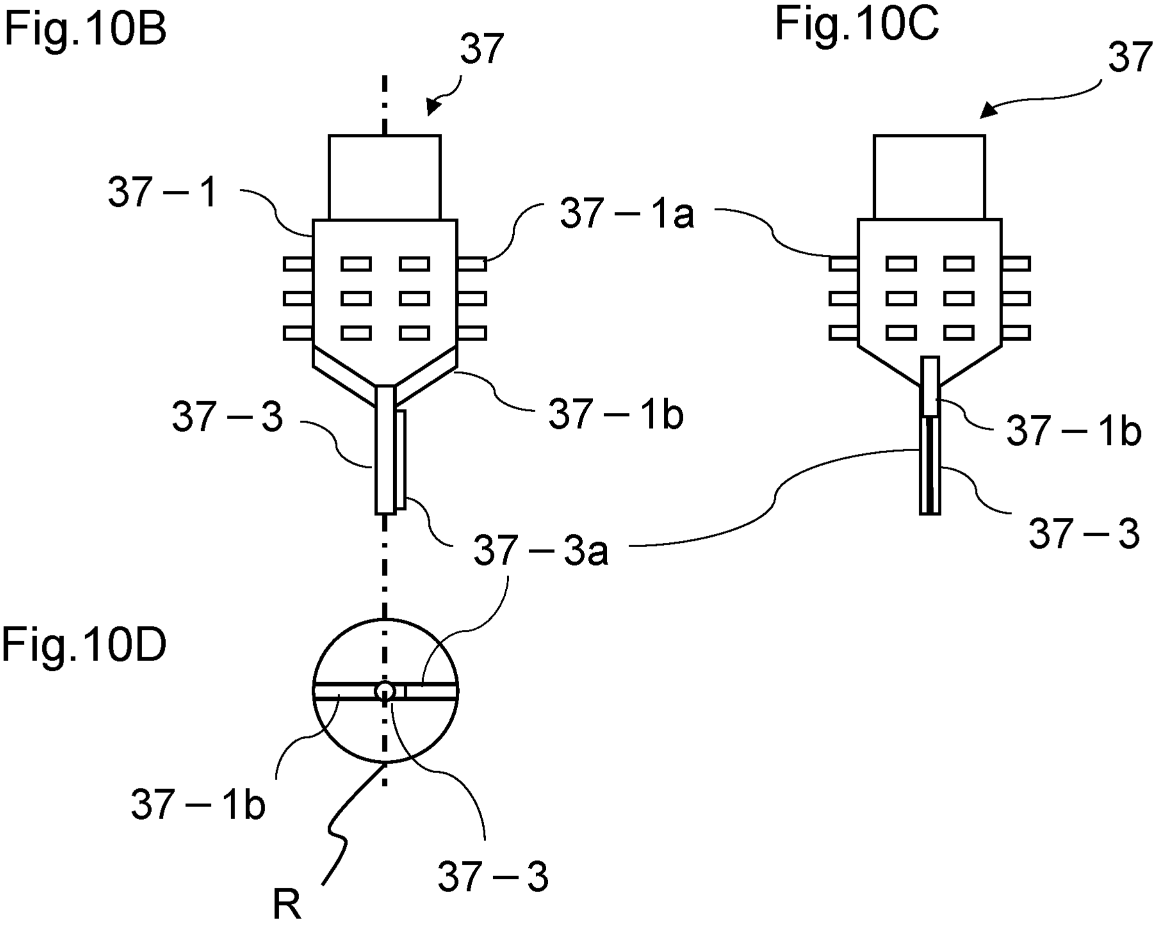

ELECTROPHOTOGRAPHIC ROLLER, PROCESS CARTRIDGE AND ELECTROPHOTOGRAPHIC IMAGE FORMING APPARATUS

BACKGROUND OF THE INVENTION

Field of the Invention

The present disclosure relates to an electrophotographic roller for use in an electrophotographic image forming apparatus and also to a process cartridge and an electrophotographic image forming apparatus.

Description of the Related Art

In electrophotographic image forming apparatuses such as copiers, facsimiles, printers, and the like using an electrophotographic method, an electrophotographic photosensitive member, hereinafter also referred to as a "photosensitive member", is charged by a charging roller and exposed to light. As a result, an electrostatic latent image is formed on the photosensitive member. Next, a toner in a developing container is applied onto the toner carrying member by a toner supply roller and a toner restricting member. Next, the toner carrying member transports the toner to a development area. The electrostatic latent image on the photosensitive member is developed by the toner transported to the development area on the photosensitive member and a toner carrying member portion or a portion adjacent to the toner carrying member. After that, the toner on the photosensitive member is transferred to recording paper by a transfer means and fixed by heat and pressure, and the toner remaining on the photosensitive member is removed by a cleaning blade.

In an electrophotographic image forming apparatus, a roller having a foamed elastic layer is often used. For example, Japanese Patent Application Publication No. 2009-217035 discloses a foam elastic roller having a resin film including a hydrotalcite compound on the peripheral surface.

In recent years, various types of paper have been used in electrophotographic image forming apparatuses. Some such papers contain large amounts of inorganic compounds such as talc as a filler. When paper containing a large amount of talc (hereinafter referred to as "talc paper") is used to form an electrophotographic image, fogging may occur in the electrophotographic image. The reason therefor is considered as follows.

When talc paper comes into contact with a photosensitive member during a transfer process, part of the talc contained in the talc paper adheres to the surface of the photosensitive member. Of the talc adhering to the surface of the photosensitive member, talc having a small particle diameter slips through the cleaning portion of the photosensitive member, passes through the process of charging the photosensitive member, and reaches the position where the photosensitive member and the developing container face each other. At this time, talc (having a property of being much more likely to be negatively charged as compared with the toner) electrostatically adheres to the surface of the toner carrying member, which is set to a higher potential than the non-image portion of the photosensitive member.

The toner carrying member has a function of increasing the electric charge (charge quantity) of the toner by contacting and/or rubbing with the toner. However, where talc adheres to the surface of the toner carrying member, the surface of the toner carrying member cannot come into contact with the toner, so the function of increasing the charge quantity of the toner deteriorates. As a result, the insufficiently charged toner is also developed on the surface of the photosensitive member, which should not be developed (non-image area), resulting in a fogged image. Hereinafter, such fogging is also referred to as "talc paper fogging". Under these circumstances, it has been recognized that it is necessary to develop an electrophotographic roller that can more reliably remove talc, which has adhered to the toner carrying member, by being brought into contact with the toner carrying member.

SUMMARY OF THE INVENTION

At least one aspect of the present disclosure is directed to providing an electrophotographic roller capable of efficiently removing talc from the surface of a toner carrying member. At least one aspect of the present disclosure is directed to providing a process cartridge that contributes to the formation of high-quality electrophotographic images. Yet another aspect of the present disclosure is directed to providing an electrophotographic apparatus capable of stably outputting high-quality electrophotographic images.

According to at least one aspect of the present disclosure, there is provided an electrophotographic roller comprising a substrate and a foam layer on an outer peripheral surface of the substrate, the foam layer constituting an outer surface of the electrophotographic roller, and the foam layer comprises a plurality of cells open on the outer surface. The foam layer has a zero-point charge measured using a standard carrier of 40 μC/g or more.

According to at least one aspect of the present disclosure, there is provided a process cartridge that is configured to be detachable to a main body of an electrophotographic image forming apparatus, the process cartridge comprises the electrophotographic roller.

Further, according to at least one aspect of the present disclosure, there is provided an electrophotographic image forming apparatus comprising the electrophotographic roller.

Further features of the present invention will become apparent from the following description of exemplary embodiments with reference to the attached drawings.

BRIEF DESCRIPTION OF THE DRAWINGS

FIGS. 10A to 10D are schematic diagrams of a mixing head.

DESCRIPTION OF THE EMBODIMENTS

Figure 1:
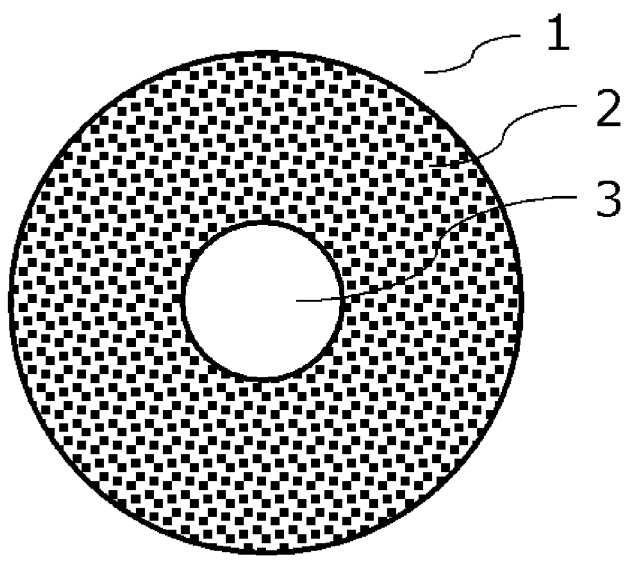
FIG. 1 is schematic cross-sectional view of an electrophotographic roller according to one embodiment of the present disclosure.

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined.

An electrophotographic roller according to at least one aspect of the present disclosure has a substrate and a foam layer on an outer peripheral surface of the substrate. The foam layer constitutes an outer surface of the electrophotographic roller, and the foam layer comprising a plurality of cells open on an outer surface. The zero-point charge of the foam layer measured using a standard carrier is 40 μC/g or more.

The zero-point charge of the foam layer is a value calculated by a method including the following steps (i) to (vii).

Calculation Method

Step (i): Standard carriers P-01, P-02, N-02, and N-01 of the Imaging Society of Japan are prepared as the first to fourth reference powders, respectively, and the charge quantity test value of the first to fourth reference powders is calculated.

Step (ii): The electrophotographic roller to be measured is allowed to stand in an environment with a temperature of 23.5° C. and a relative humidity of 50% for 24 h.

Step (iii): Under above environment, the electrophotographic roller is placed so that the rotation axis thereof is horizontal, and 5 g of the first reference powder is allowed to flow down over 12 sec from a funnel having a leg portion with an inner diameter of 1.5 mm so that a point A on the peripheral surface of the electrophotographic roller becomes the center of the drop. Then, the charge quantity Q of the first reference powder dropped below the electrophotographic roller and the amount Wg of the dropped first reference powder are measured and a triboelectric charge quantity of the first reference powder is calculated using a following formula (1).

$$\text{Triboelectric charge quantity } Q/M[\mu C/g]=Q/W \quad (1)$$

The point A is obtained as follows. In a plan view of the electrophotographic roller when the electrophotographic roller is placed so that the rotation axis thereof is horizontal, the view being taken from above vertically, a line segment L orthogonal to the direction along the rotation axis is drawn to pass through a midpoint C of the electrophotographic roller in the direction along the rotation axis. The intersections of the line segment L with the electrophotographic roller are defined as point c1 and point c2, and a position which is 1 mm from the point c1 toward the point c2 along the line segment L and which is at the outer circumference of the electrophotographic roller is taken as the point A. The funnel is placed at a position where the distance between the tip of the leg of the funnel and the point A is 15 mm.

Step (iv): Following the step (iii), the electrophotographic roller is rotated 90° counterclockwise, and then the triboelectric charge quantity of the second reference powder is calculated in the same manner as in the step (iii), except that the second reference powder is used.

Step (v): Following the step (iv), the electrophotographic roller is further rotated 90° counterclockwise, and then the triboelectric charge quantity of the third reference powder is calculated in the same manner as in the step (iii), except that the third reference powder is used.

Step (vi): Following the step (v), the electrophotographic roller is further rotated 90° counterclockwise, and then the triboelectric charge quantity of the fourth reference powder is calculated in the same manner as in the step (iii), except that the fourth reference powder is used.

Step (vii): The four values of the triboelectric charge quantity of the first to fourth reference powders are plotted on a graph in which the X-axis is the charge quantity test value of the reference powder and the vertical axis is the triboelectric charge quantity, a regression line is drawn by the least squares method, and the intersection of the regression line and the X-axis is defined as the zero-point charge of the electrophotographic roller.

By contacting the surface of the toner carrying member with the foam roller having a foam layer having cells open on the surface, the talc adhering to the toner carrying member can be physically removed. However, where paper containing a large amount of talc is continuously used for forming electrophotographic images, there is a limit to how much talc can be removed from the toner carrying member by such a physical method. Therefore, the inventors of the present disclosure have investigated the possibility of electrostatically removing talc from a toner carrying member by utilizing the property that talc is extremely easily charged negatively.

Specifically, a possibility of increasing the positive charging ability of the foam layer so that the negatively charged talc could be electrostatically attracted to the foam layer in addition to physical scraping by the cells that are open on the surface has been investigated. In this process, the use of zero-point charge was considered as an evaluation index for the charging performance of the foam layer. A zero-point charge is a parameter representing the order of triboelectric series. Specifically, the numerical value of the zero-point charge indicates that where the value is positive and the absolute value thereof is large, the likelihood of positive charging is high, and where the value is negative and the absolute value thereof is large, the likelihood of negative charging is high. The zero-point charge can be calculated from the charge quantity of a standard carrier with a known charge quantity and the standard carrier charge quantity when the standard carrier is brought into contact with the object to be measured.

Talc, which is easily charged negatively, is strongly electrostatically attracted to positively charged substances. Therefore, the greater the positive zero-point charge of the foam layer of the electrophotographic roller, the better the talc adhering to the surface of the member in contact with the foam layer is electrostatically attracted (hereinafter also referred to as removal) to the foam layer. As will be described hereinbelow, in this measurement, the standard carrier is brought into contact with the foam layer of the electrophotographic roller to directly measure the charging performance of the foam layer.

In order to obtain a large positive value of the zero-point charge of the foam layer, the present inventors investigated incorporating a substance that is easily positively charged into the foam layer. First, hydrotalcite particles, which are a substance that is easily positively charged, were added to a mixed resin solution before foaming, then a roller was molded, and the zero-point charge of the foam layer was measured. However, the value of zero-point charge hardly changed compared to the case without the addition of hydrotalcite particles. This is probably because the surface of the hydrotalcite particles in the foam layer was covered with resin, and the standard carrier could not come into direct contact with the particles.

Therefore, an attempt was made to remove the resin by decomposing the resin covering the surface of the hydrotalcite particles by irradiating the foam layer with ultraviolet rays. As a result, at least a part of the resin covering the hydrotalcite particles on the surface of the foam layer (including the inner walls of the cells that are open on the outer surface of the foam layer) was decomposed, and as a result, the hydrotalcite particles could be at least partially exposed on the surface of the foam layer (including the inner walls of the cells that are open on the outer surface of the foam layer).

Then, it was confirmed that the foam layer with hydrotalcite exposed on the surface had a greatly increased zero-point charge. In the electrophotographic roller according to the present disclosure, the surface of the foam layer includes the outer surface of the foam layer and the inner walls of the cells open on the outer surface.

Next, the inventors conducted the following preliminary experiment in order to investigate the relationship between the zero-point charge of the electrophotographic roller and the talc removal ability.

First, electrophotographic rollers with different zero-point charges were prepared. Then, all toner was removed from a magenta cartridge of a laser printer (trade name: LBP7200C, manufactured by Canon Inc.), talc (product code: 020-76007, manufactured by Kishida Chemical Co., Ltd.) was mixed at a ratio of 135 mg per 100 g of the removed toner, and the mixed toner was filled in the cartridge again.

Furthermore, the toner supply roller mounted on the cartridge was replaced with a prepared electrophotographic roller. After the replacement, the toner seal was pulled out, the cartridge was loaded into a laser printer, and 20 images with a print percentage of 1% were continuously output in a normal-temperature and normal-humidity environment (temperature 23±2° C., relative humidity 50±5%).

After that, in the middle of outputting a solid white image, the power of the laser printer was turned off, and the toner on the photosensitive member was transferred to a transparent adhesive tape (polyester tape, product number: 5511, manufactured by Nichiban Co., Ltd.) and attached to paper (trade name: Vitality, manufactured by Xerox Corp.). A transparent adhesive tape which has no transferred toner was attached for comparison to the side to which the tape was attached, and the reflectance (%) of each adhesive tape was measured with a reflection densitometer (trade name: TC-6DS/A, made by Tokyo Denshoku Co., Ltd.). The value obtained by subtracting the reflectance of the tape to which the toner was transferred from the reflectance of the tape (to which the toner was not transferred) for comparison was taken as a fogging value (%) on the drum.

Next, the toner carrying member (developing roller) was taken out from the magenta cartridge, and the air was blown on the surface of the toner carrying member to remove the toner. A part of the surface of the toner carrying member subjected to air blowing was cut out, and platinum was vapor-deposited (trade name: E-1045, manufactured by Hitachi High-Tech Technology Co., Ltd., discharge voltage: 15 mA, discharge time: 30 sec) thereon to prepare an observation sample.

The observation sample was analyzed using energy dispersive X-ray analysis (EDS, model number: NSS312E, manufactured by Thermo Fisher Scientific Co.), and the atomic composition ratio (Mg/Pt) of magnesium (Mg) contained in the talc and vapor-deposited platinum (Pt) was obtained. That is, the talc adhesion amount on the surface of the toner carrying member was obtained. In this method, the platinum vapor deposition conditions, that is, the vapor-deposited amount of platinum was kept constant. Therefore, by obtaining the value of Mg/Pt, it is possible to quantitatively ascertain the adhesion amount of Mg (derived from talc) on the surface of the toner carrying member.

The above experiment was repeated for electrophotographic rollers with different points of zero charge. Plotting the zero-point charge of the electrophotographic roller and the Mg/Pt value obtained by the above method gave the relationship shown in FIG. 2A.

Figure 2A:
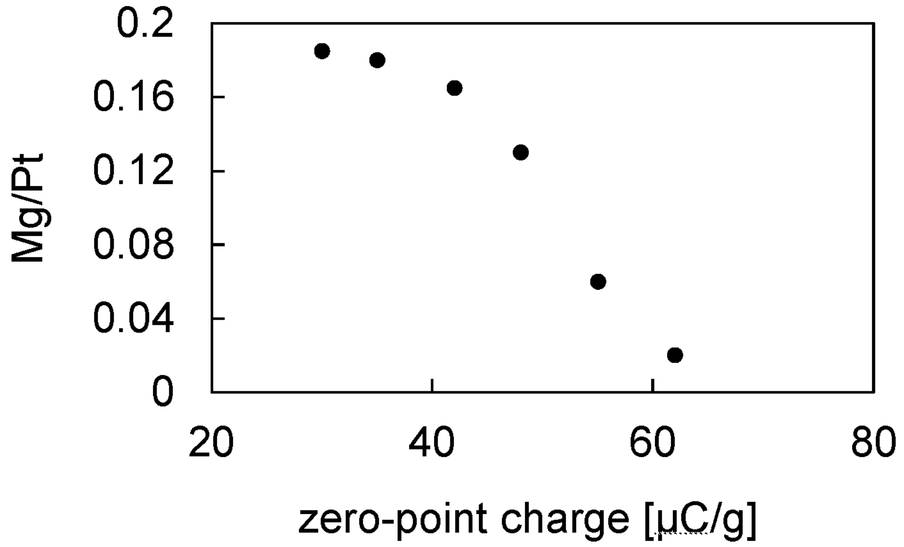
FIGS. 2A and 2B show the relationships between a zero-point charge, Mg/Pt, and fogging on a drum related to a preliminary study.

As is clear from FIG. 2A, it was found that by using an electrophotographic roller (toner supply roller) with a larger zero-point charge value, it is possible to reduce the Mg/Pt value on the toner carrying member, that is, the talc adhesion amount on the toner carrying member, to a greater degree. This tendency was more pronounced when the zero-point charge value was 40 μC/g or more.

Figure 2B:
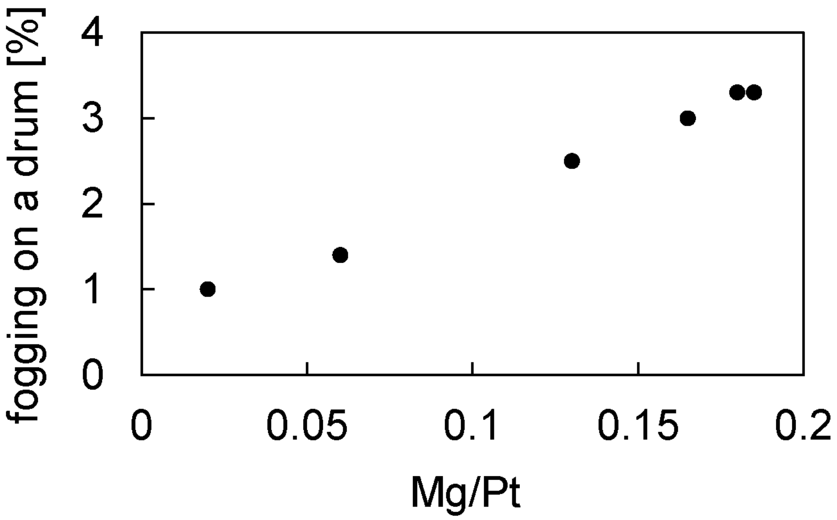

Furthermore, as shown in FIG. 2B, it was confirmed that the fogging on the drum can be suppressed by suppressing the Mg/Pt value on the toner carrying member, that is, the talc adhesion amount on the toner carrying member.

The present disclosure relates to an electrophotographic roller comprising

- a substrate and a foam layer on an outer peripheral surface of the substrate, wherein
- the foam layer comprises a plurality of cells open on an outer surface,
- the foam layer constitutes an outer surface of the electrophotographic roller, and
- the foam layer has a zero-point charge measured using a standard carrier of 40 μC/g or more.

Also, when the electrophotographic roller is used as a cleaning roller that rotates in contact with the photosensitive member, the talc is collected before reaching the area where the toner carrying member and the photosensitive member face each other, thereby making it possible to suppress the talc paper fogging.

Japanese Patent Application Publication No. 2009-217035 (paragraph [0010]) discloses that the foam roll according to Japanese Patent Application Publication No. 2009-217035 can attract and remove ozone or oxides such as nitrogen oxides that adhere to a charging roll by a function of attracting acids of hydrotalcite compounds on the peripheral surface of the foam roll. Further, as a specific configuration of the foam roll, it is indicated in paragraph [0010] that a preferred configuration has a resin film mixed with a hydrotalcite compound on the peripheral surface.

Furthermore, in paragraphs [0024] to [0026], the foam structure of a foam roll formed by impregnating a roll-shaped urethane foam with a copolymerized nylon resin in which hydrotalcite compound particles are mixed in a predetermined ratio and curing the resin is explained in the following manner with reference to FIG. 3. That is, it is shown that a copolymerized nylon resin film in which hydrotalcite compound particles are dispersedly arranged is formed on the wall surface forming the foam cells, and the hydrotalcite compound particles are exposed from the copolymerized nylon resin film.

Here, when the present inventors examined the foam elastic roller according to Japanese Patent Application Publication No. 2009-217035, it was not possible to produce a foam layer with a zero-point charge exceeding 35 μC/g. A foam roller having a foam layer with a zero-point charge of 35 μC/g could not sufficiently remove talc adhering to the surface of the toner carrying member. The reason for the low value of the zero-point charge of the foam roller disclosed in Japanese Patent Application Publication No. 2009-217035 is considered as follows.

That is, in the foam roll, the hydrotalcite compound particles are fixed to the cell wall surface or the like by the copolymerized nylon resin film, but no active removal of the copolymerized nylon resin covering the hydrotalcite compound particles is performed in the production process of the foam roll. Therefore, exposure of the hydrotalcite compound particles from the copolymerized nylon resin film is considered to be insufficient for achieving the zero-point charge according to the present disclosure.

(1) Electrophotographic Roller

An electrophotographic roller according to one aspect of the present disclosure has a conductive substrate and a foam layer on the outer peripheral surface of the substrate. An example of an electrophotographic roller is shown in FIG. 1. An electrophotographic roller 1 shown in FIG. 1 is composed of a conductive substrate 3 and a foam layer 2 provided on the outer periphery thereof.

The layer structure of the electrophotographic roller 1 is not limited to the one configured only of the substrate 3 and the foam layer 2 and may also have an elastic layer between the substrate 3 and the foam layer 2. The configuration of the electrophotographic roller will be described in detail below.

Substrate

The substrate 3 functions as a support member of the electrophotographic roller and as an electrode. The substrate is made of a conductive material such as a metal or alloy such as aluminum, a copper alloy, a stainless steel or the like, iron plated with chromium or nickel, or a conductive synthetic resin. For example, the substrate is a metal core. The substrate is solid cylindrical or hollow cylindrical.

Foam Layer

The foam layer 2 has a plurality of cells open on the outer surface. The foam layer 2 constitutes the outer surface of the electrophotographic roller 1. That is, the foam layer 2 is the outermost layer of the electrophotographic roller 1.

The outer peripheral surface of the electrophotographic roller 1 is composed of the outer surface of the foam layer 2 and the inner peripheral surface of the cells in the foam layer 2 that are open on the outer surface. The zero-point charge of the foam layer 2 is 40 μC/g or more. "Cells" means an air bubble present in the foam layer and an air bubble open on the outer surface of the foam layer.

The zero-point charge of the foam layer 2 is preferably 44 μC/g or more, more preferably 50 μC/g or more, still more preferably 55 μC/g or more, and even more preferably 60 μC/g or more. Meanwhile, the upper limit is not particularly limited but is preferably 100 μC/g or less, more preferably 80 μC/g or less, and even more preferably 70 μC/g or less. Therefore, the zero-point charge of the foam layer is preferably in the range of, for example, from 44 to 100 μC/g, particularly preferably in the range of from 50 to 80 μC/g, further preferably from 55 to 70 μC/g.

Particles

As one method for increasing the zero-point charge of the foam layer 2, there is a method in which particles are present in the foam layer in a state of being at least partially exposed on the surface of the foam layer. The particles are not particularly limited, but preferably comprise a compound containing at least one metal element. The Pauling electronegativity of the metal element is preferably 1.70 or less, more preferably 1.60 or less, further preferably 1.50 or less, even more preferably 1.40 or less, and particularly preferably 1.35 or less.

Where the electronegativity value is small, electrons are easily emitted (positive charging easily occurs), so the zero-point charge of the foam layer can be set to a larger positive value. Therefore, the lower limit is not particularly limited, but for example, it is preferably 0.90 or more, more preferably 1.00 or more, further preferably 1.10 or more, and even more preferably 1.20 or more.

The metal element with a Pauling electronegativity of 1.70 or less is not particularly limited. Specifically, for example, at least one selected from the group consisting of elements of Group 1 to Group 5, chromium (Cr), manganese (Mn), aluminum (Al), zinc (Zn), cadmium (Cd), and thallium (Tl) may be indicated. From the viewpoint of safety (toxicity), at least one selected from the group consisting of elements of Group 1 to Group 5, manganese (Mn), aluminum (Al), and zinc (Zn) is preferable, and at least one selected from the group consisting of lithium (Li), manganese (Mn), aluminum (Al), and zinc (Zn) is more preferable.

When a plurality of types of particles containing metal elements is added to the foam layer, or when particles of one type containing a plurality of metal elements are added to the foam layer, the value obtained by weighted averaging of the values of Pauling electronegativity of the individual metal elements contained in each particle on the basis of a content ratio of each metal element on the atomic basis may be 1.70 or less.

In addition to the above metal elements, a compound containing a metal having a Pauling electronegativity exceeding 1.70 may be used in combination, as long as the foam layer has a zero-point charge within the range of 40 μC/g or more.

It is preferable that particles containing a metal element be exposed on the surface of the foam layer. This makes it easier to control the zero-point charge of the foam layer within the above range. More specifically, it is preferable that the particles be at least partially exposed on the outer surface of the foam layer and that the particles be at least partially exposed on the inner walls of the cells opened on the outer surface.

Figure 11:
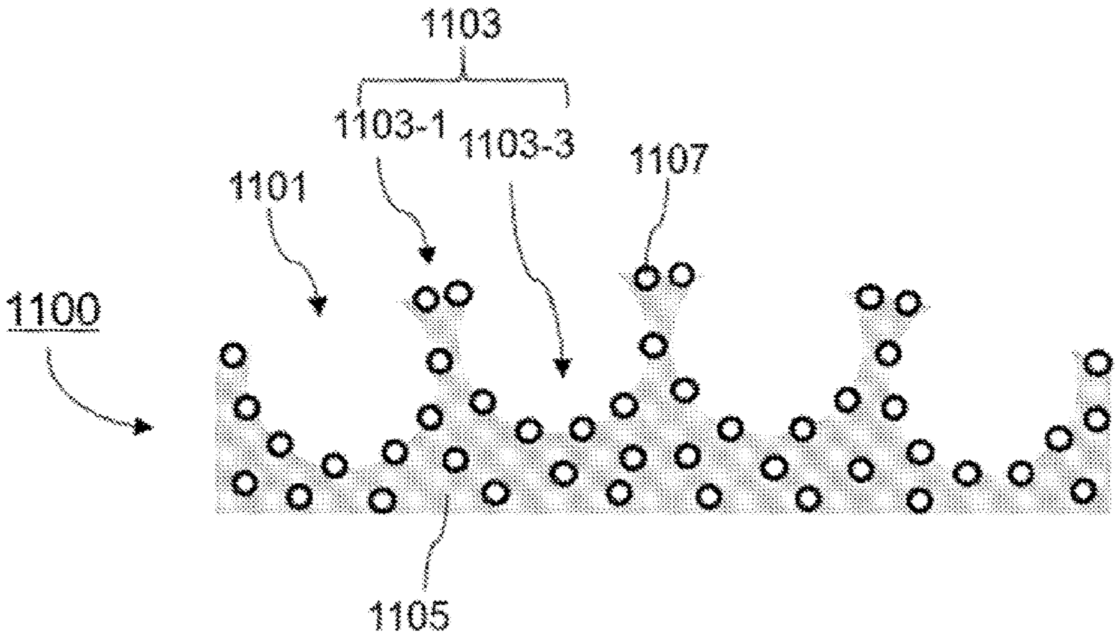
FIG. 11 is an enlarged cross-sectional view of a portion of a foam layer of the electrophotographic roller according to one embodiment of the present disclosure.

The explanation hereinbelow will be conducted using FIG. 11, which is a partial enlarged view of the foam layer of the electrophotographic roller according to one embodiment of the present disclosure.

A foam layer 1100 has a plurality of cells 1101 open on the outer surface of the foam layer 1100. Further, the foam layer 1100 comprises a binder resin 1105 and a plurality of particles 1107 dispersed in the binder resin 1105. The plurality of particles 1107 are at least partially exposed on an outer surface 1103-1 of the foam layer 1100 and on inner walls 1103-3 of the cells 1101 open on the outer surface. In the present disclosure, the surface of the foam layer 1100 includes both the outer surface 1103-1 of the foam layer 1100 and the inner walls 1103-3 of the cells open on the outer surface 1103-1. Also, the "exposure" of the particles means that at least part of one particle 1107 is not covered with the binder resin 1105 and constitutes part of the surface of the foam layer.

According to such a configuration, the particles 1107 present on the outer surface 1103-1 of the foam layer 1100 can electrostatically attract talc, and the talc that has entered the interior of the cells 1101 due to scraping by the outer surface 1103-1 of the foam layer 1100 is also attracted by the particles 1107 exposed on the inner walls 1103-3 of the cells. As a result, a larger amount of talc can be attracted.

The foam layer preferably has an open-cell or semi-open-cell cell structure. In particular, in a foam layer having an cell structure with open-cell, ultraviolet rays and electron beams can easier reach the inside of the foam layer and the resin covering the particle surface can be decomposed and removed over a wider area than in a foam layer with closed cell. Therefore, the talc attraction effect can be significantly increased.

The degree of exposure of particles from the foam layer can be quantified by X-ray photoelectron spectroscopy (XPS), which will be described hereinbelow.

Specifically, the total content ratio 51 of metal elements having a Pauling electronegativity of 1.70 or less as measured by X-ray photoelectron spectroscopy of the outer surface of the foam layer is preferably 0.4 atomic % or more, more preferably 0.6 atomic % or more, and even more preferably 1.0 atomic % or more. The upper limit is not particularly limited, but is preferably 5.0 atomic % or less, more preferably 3.0 atomic % or less, further preferably 2.0 atomic % or less, and even more preferably 1.6 atomic % or less. For example, 51 is preferably from 0.4 to 5.0 atomic %, more preferably from 0.6 to 3.0 atomic %, even more preferably from 1.0 to 2.0 atomic %.

In addition, the total content ratio S2 of the metal elements having a Pauling electronegativity of 1.70 or less, which is measured by X-ray photoelectron spectroscopy of the inner walls of the cells open on the outer surface of the foam layer, is preferably 0.4 atomic % or more, more preferably 0.6 atomic % or more, and even more preferably 1.0 atomic % or more. The upper limit is not particularly limited, but is preferably 5.0 atomic % or less, more preferably 3.0 atomic % or less, further preferably 2.0 atomic % or less, and even more preferably 1.5 atomic % or less. For example, S2 is preferably from 0.4 to 5.0 atomic %, more preferably from 0.6 to 3.0 atomic %, even more preferably from 1.0 to 2.0 atomic %.

When confirming the exposure of particles on the outer surface of the foam layer, the measurement is performed by focusing the X-rays on the outer surface portion of the foam layer.

When measuring the inner wall of the cell, the measurement is performed by focusing X-rays on the inner wall of the cell through the opening of the cell. At this time, the inner wall of the cell can be selectively measured by measuring with X-rays having a width smaller than that of the cell opening.

When the size of the cell opening is smaller than the width of X-rays, the outer surface can be polished by 500 μm and the measurement can be performed by focusing X-rays on the non-polished surface for measurement.

The content ratio can be controlled by the amount of metal element added and the extent to which the particles are exposed from the cell, such as the intensity of ultraviolet irradiation.

Meanwhile, in the case of an electrophotographic roller in which the particles are merely physically adhered to the foam layer, the particles are easily peeled off from the foam layer with only a small amount of use of the electrophotographic roller, and the effect of substantially attracting talc is difficult to obtain. Therefore, it is preferable to expose the particles to the inner wall of the cell in order to control the zero-point charge within the above range. It is also preferable to partially bury the particles in the foam layer or chemically bond (covalently bond etc.) the particles to the foam layer.

An example of a compound containing a metal element having a Pauling electronegativity of 1.70 or less is a hydrotalcite compound represented by the following formula (1).

$$Mg_{(1-x)}Al_x(OH)_2(CO_3)_{x/2}\cdot mH_2O \quad (1)$$

In the formula (1), x is $0.00<x\leq 0.50$ (x is more preferably from 0.10 to 0.40, more preferably from 0.20 to 0.30), m is a positive number (more preferably from 0.2 to 1.0, more preferably from 0.4 to 0.7).

Other examples include metal oxides such as MgO, ZnO, $Eu_2O_3$, $Y_2O_3$, CdO, CoO, NiO, HgO, CuO and $Al_2O_3$, metal composite oxides such as $MgAl_2O_4$ and $ZnAl_2O_4$, and the like.

Among the above compounds, it is preferable that the particles include at least one from the group consisting of magnesium oxide and hydrotalcite compounds, and more preferably magnesium oxide, because such particles have a high positive charging performance.

There is no particular limitation on the average particle diameter of the particles (arithmetic average of Feret diameters of the particles including the unexposed portions). However, in order to attract and hold talc by electrostatic attraction, the talc preferably has a certain size or more, specifically 100 nm or more. Further, in order to prevent the particles from falling off from the foam layer during the use of the electrophotographic roller, the particle diameter is preferably set to a certain value or less, specifically 50 μm or less.

The average particle diameter of the particles is more preferably from 0.3 to 25.0 μm, still more preferably from 1.0 to 3.0 μm.

The average particle diameter of the particles is measured by first heating the foam layer to 500° C. to decompose the binder. After that, the residue is collected and an image of the particles is captured using a known microscope or the like. The average particle diameter is obtained by measuring the Feret diameter for the vertical direction of the image and the parallel direction.

The content ratio of the particles in the foam layer is not particularly limited as long as the zero-point charge of the foam layer can be controlled within the above range. The content ratio of the particles in the foam layer is preferably from 1 to 20 parts by mass, more preferably from 2 to 15 parts by mass, and still more preferably from 3 to 10 parts by mass with respect to 100 parts by mass of the resin (binder resin) contained in the foam layer.

Resin

The foam layer preferably has a foamable binder resin. For example, the foam layer preferably has particles dispersed in a binder resin. The resin for the foam layer is not particularly limited and can be selected, as appropriate for use from known resins.

Examples include epoxy resins, urea resins, ester resins, amide resins, imide resins, amide-imide resins, phenol resins, vinyl resins, silicone resins, and fluorine resins. The following rubber materials can be also suitably used as the resin for the foam layer. Examples of rubber materials include ethylene-propylene-diene copolymer rubber, acrylonitrile-butadiene rubber, chloroprene rubber, natural rubber, isoprene rubber, styrene-butadiene rubber, silicone rubber, epichlorohydrin rubber, polyurethane, and the like.

A polyurethane and acrylonitrile-butadiene rubber are preferred. Among them, a polyurethane is preferably used because it has an electron-donating nitrogen element in the structure and is easily charged positively. That is, the foam layer preferably contains a polyurethane as a binder resin. In addition, a polyurethane is preferably used because it is easily decomposed by irradiation with electron beams or ultraviolet rays, and the particles can be easily exposed (the resin thinly covering the particle surface can be decomposed and removed).

For the polyurethane, for example, a known reaction product of a polyol and an isocyanate can be used.

The polyol is not particularly limited and can be selected, as appropriate, for use from various polyols known as raw materials for polyurethane. For example, the polyol can be selected, as appropriate, for use from known polyols such as polyether polyols and polyester polyols that are generally used in the production of soft polyurethane foams. One type of polyol may be used, or two or more types may be used in combination.

Among the above polyols, the use of polyether polyols is suitable for producing soft, highly elastic polyurethane foams with excellent resistance to moisture and excellent thermal durability. For example, polyethylene propylene ether triol is preferred.

The isocyanate is not particularly limited and can be selected, as appropriate, for use from various isocyanates conventionally known as raw materials for polyurethanes. For example, 2,4-tolylene diisocyanate (2,4-TDI), 2,6-tolylene diisocyanate (2,6-TDI), tolidine diisocyanate (TODI), naphthylene diisocyanate (NDI), xylylene diisocyanate (XDI), 4,4'-diphenylmethane diisocyanate (MDI), carbodiimide-modified MDI, polymethylene polyphenyl isocyanate, polymeric isocyanate, and the like may be used alone or in combination of two or more. An isocyanate group-terminated prepolymer obtained by reacting an isocyanate with one or two or more known active hydrogen compounds can also be used as the isocyanate.

Aromatic isocyanates having a double bond are more preferable than aliphatic isocyanates in terms of making it easier to decompose and remove the resin covering the particle surfaces by irradiation with electron beams or ultraviolet rays. The isocyanate preferably includes at least one selected from the group consisting of 2,4-tolylene diisocyanate (2,4-TDI), 2,6-tolylene diisocyanate (2,6-TDI), and 4,4'-diphenylmethane diisocyanate (MDI).

From the viewpoint of decomposition and removal of the resin by irradiation with electron beams or ultraviolet rays, it is preferable that the urethane resin contain a certain amount or more of an aromatic isocyanate. Specifically, the ratio (molar ratio) of isocyanate groups is preferably 0.9 or more, more preferably 0.95 or more, to 1.0 of hydroxyl groups in the polyol.

Other Components

A catalyst, a foaming agent, a foam stabilizer, and other auxiliary agents can be used as necessary.

The catalyst is not particularly limited and can be selected, as appropriate, for use from among various known catalysts. For example, amine-based catalysts (triethylenediamine, bis(dimethylaminoethyl)ether, N,N,N',N'-tetramethylhexanediamine, 1,8-diazabicyclo(5,4,0)undecene-7,1,5-diazabicyclo(4,3,0)nonene-5,1,2-dimethylimidazole, N-ethylmorpholine, N-methylmorpholine, and the like), organometallic catalysts (tin octylate, tin oleate, dibutyltin dilaurate, dibutyltin diacetate, tetra-i-propoxytitanium, tetra-n-butoxytitanium, tetrakis(2-ethylhexyloxy)titanium, and the like), acid salt catalysts (carboxylates, formates, octylates, borates, and the like) in which the initial activity of the amine-based catalysts and organometallic catalysts is reduced can be used. One type of catalyst may be used, or two or more types may be used in combination.

The foaming agent for foaming the resin of the foam layer is not particularly limited and can be selected, as appropriate, for use from various known foaming agents. In particular, when a polyurethane or polyurea binder resin is used, the use of water as a foaming agent produces carbon dioxide gas by reaction with isocyanate. Therefore, water is suitable as the foaming agent. Moreover, water may be used together with another foaming agent.

The foam stabilizer is not particularly limited can be selected, as appropriate, for use from among various known foam stabilizers.

As other auxiliary agents, if necessary, cross-linking agents, vulcanizing agents, vulcanization accelerators, vulcanizing aids, flame retardants, colorants, ultraviolet absorbers, antioxidants, conductive agents, and the like may be used as long as they do not interfere with the effects of the present disclosure. As the conductive agent, an electron-conducting agent such as carbon black or an ion-conducting agent can be used.

Another method for setting the zero-point charge of the foam layer within the above range is a method using an organic charge-imparting agent. Specifically, a foam layer having a zero-point charge of 40 μC/g or more can be obtained by using an acrylic resin having a quaternary ammonium base which has high positive charging performance. Examples of quaternary ammonium bases include, for example, ammonium groups (preferably $—N(CH_3)_2(C_8H_{17})^+$).

Examples of acrylic resins having such a quaternary ammonium base include polymers of methyl methacrylate and dimethylaminoethyloctyl bromide methacrylate.

For example, when a polyurethane is used as the binder resin, the acrylic resin is likely to be exposed on the outer surface of the foam layer and the surface of the cells due to the polarity relationship between the two. As a result, it becomes easier to set the zero-point charge of the foam layer to 40 μC/g or more. The method using such an acrylic resin may be used independently from or in combination with the above-described method using a compound containing a metal element having an electronegativity of 1.70 or less.

Acrylic resins having an amino group (—NR1R2; R1 and R2 represent, for example, alkyl groups) in the molecule are often highly compatible with polyurethanes. Therefore, when a polyurethane is used as the binder for the foam layer, the acrylic resin is less likely to be exposed on the outer surface of the foam layer and the surface of the cells.

Therefore, when such an acrylic resin is used, it is difficult to obtain a foam layer with a zero-point charge of 40 μC/g or more.

Method for Forming Foam Layer

There are no particular restrictions on the method for foaming the foam layer. Any method, such as a method using a foaming agent or a method of mixing air bubbles by mechanical stirring, can be used. The expansion ratio may be determined as appropriate, and is not particularly limited.

For example, the foam layer of the electrophotographic roller can be obtained by mixing the following materials 1 to 5 and allowing them to react while foaming.

1. As materials for forming the binder resin, Polyether polyol, polyester polyol, and the like. Isocyanate.
2. Particles comprising a compound containing at least one metal, the metal having a Pauling electronegativity of 1.7 or less.
3. Catalyst.
4. Foam stabilizer.
5. Foaming agent.

There are no particular restrictions on the method for joining the substrate and the foam layer. A method in which the substrate is placed in advance in a mold (molding die) and the raw material mixture as described above is injected and cured, a method in which the raw material mixture is molded in advance into a predetermined shape to be a foam layer and then bonded to the substrate, and the like can be used. In any of the methods, an adhesive layer may be optionally provided between the substrate and the foam layer. Known materials such as adhesives and hot-melt sheets can be used for this adhesive layer.

In the case of the injection curing method, a release agent may be applied in advance to the inner wall of the mold. A known release agent can be used as the release agent. Examples thereof include a water-based release agent containing an olefin component and a silicone component, and a release agent obtained by dissolving a fluorine component in a fluorine-based solvent.

There are no particular restrictions on the method for forming the shape of the foam layer. For example, in addition to the method of injection into a mold of a predetermined shape as described above, a method of cutting a block of foam (so-called slab foam) into a predetermined size by machining and then polishing into a cylindrical shape, and a method of molding to predetermined dimensions with an extruder, and the like can be used.

There are no particular restrictions on the method for exposing the particles contained in the resin from the inner walls of the cells. For example, a method of polishing the surface of the foam layer, a method of irradiating with ultraviolet rays using a low-pressure mercury lamp, a method of irradiating with electron beams, and the like can be used. Among them, irradiation with ultraviolet rays or electron beams does not apply a mechanical shearing force to the foam layer, so that the resin can be decomposed and the particles can be effectively exposed without dropping the particles from the foam layer.

There are no particular restrictions on the light quantity of ultraviolet light, etc., as long as it is controlled within the range in which the above zero-point charge can be obtained. For example, the irradiation may be performed to obtain preferably from 1000 to 10000 $mJ/cm^2$, more preferably from about 2000 to 6000 $mJ/cm^2$ in terms of the sensitivity of a 254-nm sensor. The irradiation time is, for example, preferably from 1 to 60 min, more preferably from 2 to 10 min.

The type of resin in the foam layer can be confirmed by known pyrolysis GC/MS, FT-IR, 13C-NMR, and the like.

The metal element species contained in the particles and composition ratios thereof can be confirmed by well-known energy dispersive X-ray analysis (EDS) and X-ray diffraction (XRD). The EDS analysis can reveal the metal element species of the particles and composition ratios thereof. Further, when the particles have crystallinity, a detailed composition formula can be obtained by XRD of the particle powder remaining after thermally decomposing the foam layer in a nitrogen atmosphere.

The degree of particle exposure can be confirmed by a known XPS or the like. Since the information on the outermost surface (several nm) of the region irradiated with X-rays can be obtained by XPS, the metal elements contained in the exposed particles can be qualitatively and quantitatively determined.

(2) Process Cartridge

The present disclosure provides a process cartridge that is configured to be detachable to a main body of an electrophotographic image forming apparatus and that includes the electrophotographic roller. The process cartridge preferably comprises a photosensitive member and a toner carrying member that transports toner onto the surface of the photosensitive member. It is preferable that the electrophotographic roller is at least one selected from the group consisting of a toner supply roller that supplies toner to the surface of the toner carrying member and a cleaning roller that cleans the photosensitive member after transfer.

Figure 4:
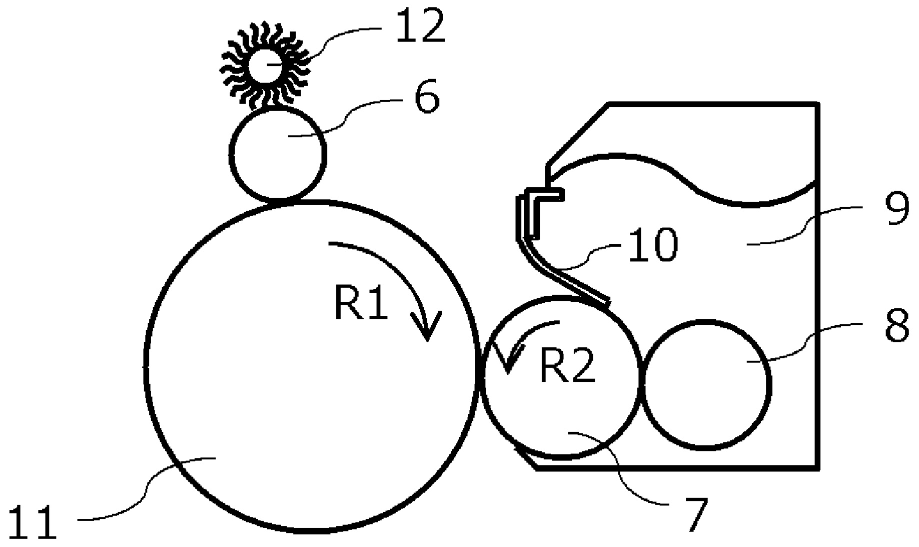
FIG. 4 is a schematic configuration diagram showing a process cartridge according to one embodiment of the present disclosure.
Figure 5:
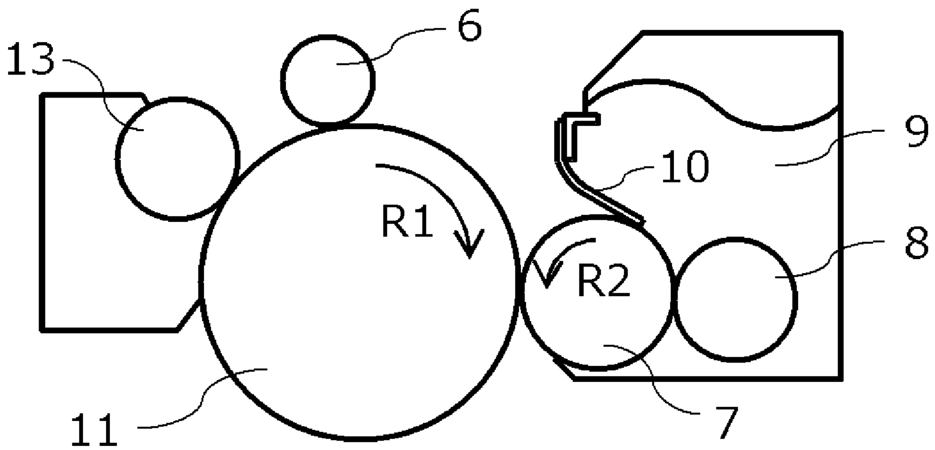
FIG. 5 is a schematic configuration diagram showing a process cartridge according to one embodiment of the present disclosure.

A process cartridge according to one embodiment of the present disclosure will be described in detail with reference to drawings, but the present disclosure is not limited thereto. FIGS. 3 and 4 are schematic configuration diagrams showing an example of a process cartridge using an electrophotographic roller according to one embodiment of the present disclosure as a toner supply roller 8. FIG. 5 is a schematic configuration diagram showing an example of a process cartridge using an electrophotographic roller according to one embodiment of the present disclosure as a cleaning roller 13.

Figure 3:
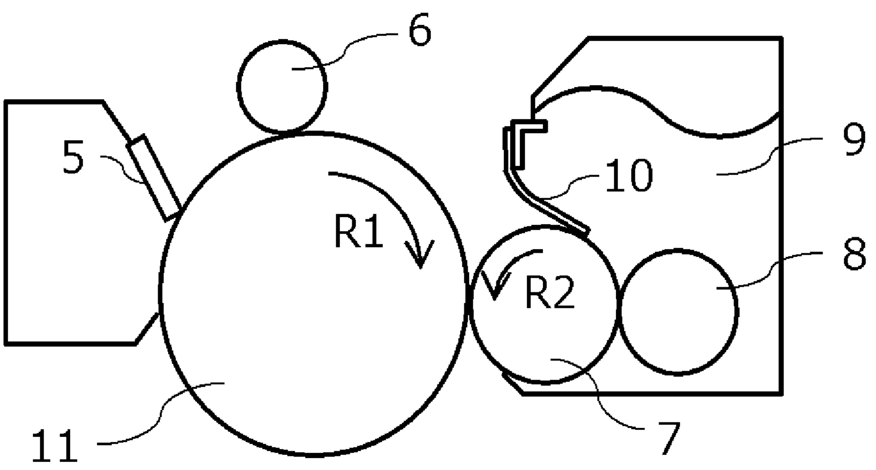
FIG. 3 is a schematic configuration diagram showing a process cartridge according to one embodiment of the present disclosure.

The process cartridge shown in FIG. 3 has a cleaning blade 5, a charging roller 6, a toner carrying member 7, the toner supply roller 8, a toner 9, a toner restricting member 10, and a photosensitive member 11, and has a configuration that can be detachably attached to the main body of an electrophotographic apparatus.

The photosensitive member 11 is charged by the charging roller 6 and rotated in the direction of arrow R1. The toner supply roller 8 rotates in contact with the toner carrying member 7 and supplies the toner to the surface of the toner carrying member 7. The toner restricting member 10 is in contact with the toner carrying member 7 and regulates the amount of toner on the surface of the toner carrying member 7. As the toner carrying member 7 rotates in the direction of arrow R2, the toner is transported to a development area where the toner carrying member 7 and the photosensitive member 11 face each other.

The process cartridge according to the present embodiment employs a so-called contact development system in which the toner carrying member 7 is arranged in contact with the photosensitive member 11. The toner remaining on the photosensitive member 11 after the transfer to the paper is scraped off by the cleaning blade 5 and stored in a cleaner container. In the present embodiment, by using the electrophotographic roller as the toner supply roller 8, the talc adhering to the toner carrying member 7 can be removed by the toner supply roller 8.

FIG. 4 shows a process cartridge having a charging roller brush 12 that rotates in contact with the charging roller.

The process cartridge shown in FIG. 5 has a cleaning roller 13 that rotates in contact with the photosensitive member, and the toner remaining on the photosensitive member 11 after the transfer to the paper is scraped off by the cleaning roller 13. By using the electrophotographic roller as the cleaning roller 13, the talc on the photosensitive member 11 can be removed before the talc reaches the area where the toner carrying member 7 and the photosensitive member 11 face each other.

(3) Electrophotographic Image Forming Apparatus

The present disclosure provides an electrophotographic image forming apparatus equipped with the electrophotographic roller.

The electrophotographic image forming apparatus comprises, for example, a photosensitive member, a toner carrying member that transports toner onto the surface of the photosensitive member, a toner supply roller that supplies the toner onto the surface of the toner carrying member, and a cleaning roller that cleans the photosensitive member. It is preferable that the electrophotographic roller is at least one selected from the group consisting of the toner supply roller and the cleaning roller.

According to one aspect of the present disclosure, it is possible to obtain an electrophotographic roller capable of efficiently removing talc from the surface of the toner carrying member. Further, according to another aspect of the present disclosure, it is possible to obtain a process cartridge that contributes to the formation of high-quality electrophotographic images. Furthermore, according to yet another aspect of the present disclosure, it is possible to obtain an electrophotographic apparatus capable of stably outputting high-quality electrophotographic images.

EXAMPLE

The present disclosure will be described in more detail hereinbelow with Examples and Comparative Examples, but the present disclosure is not limited thereto. Unless otherwise specified, the parts used in the examples are based on mass.

Example 1

Figures 6A, 6B, 6C:
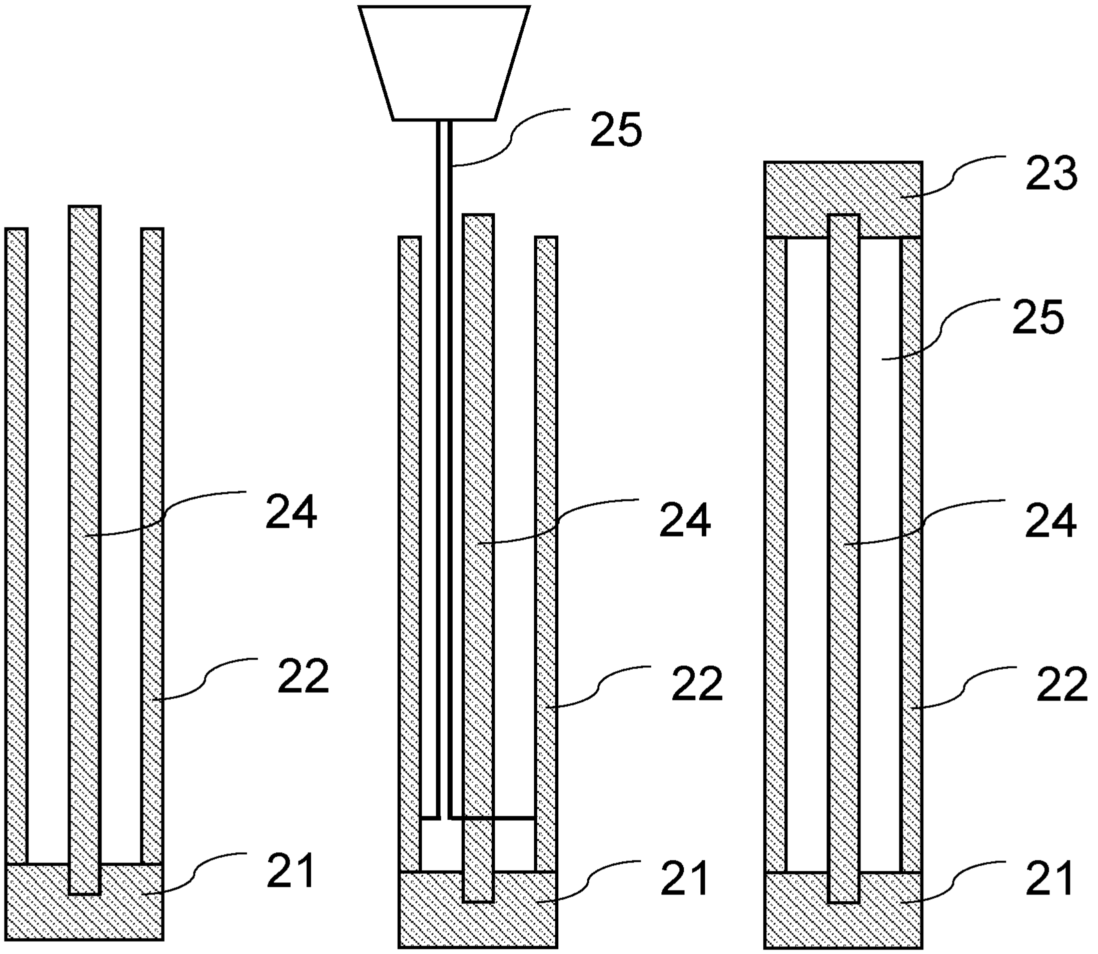
FIGS. 6A to 6C are schematic cross-sectional views of a mold when molding an electrophotographic roller according to one embodiment of the present disclosure.

As shown in FIGS. 6A to 6C, a mold composed of a cylindrical member 22 having an inner diameter of 11 mm which the inner surface is coated with a release agent, an upper piece member 23, and a lower piece member 21, and a metal core 24 having an outer diameter of 4 mm which is made of stainless steel (SUS304) as a substrate were prepared, and all of them were preheated to 70° C.

The cylindrical member 22 was mounted on the lower piece member 21, and the metal core 24 was arranged therein (FIG. 6A). A urethane rubber composition 25 obtained by mixing a liquid A and a liquid B, the liquid B being obtained by mixing the following materials (A) to (G) in advance and the liquid A being a material (H), was injected from a gap between the cylindrical member and the metal core 24 (FIG. 6B). At that time, liquids A and B were mixed using a mixing head equipped with a stirring rotor 37 and a mixing chamber 36 shown in FIGS. 10A to 10D. In addition, mixing of the liquid A and the liquid B was performed just before the injection. After injecting the urethane rubber composition 25, the upper piece member 23 was mounted on the upper end surface of the cylindrical member 22, and the metal core 24 was held concentrically with the cylindrical member 22 by the upper piece member 23 and the lower piece member 21 (FIG. 6C).

Here, as shown in FIGS. 10B to 10D, the stirring rotor 37 has a rotor body 37-1 and a tip rod 37-3. A plurality of stirring blades **37-1*a* is provided on the side portion of the rotor body 37-1. Further, a stirring blade 37-1*b* is provided on the tapered portion of the rotor body 37-1, and a stirring blade 37-3*a* is provided on the side portion of the tip rod 37-3. FIG. 10C is a side view when the stirring rotor shown in FIG. 10B is rotated by 90 degrees around a rotation axis R, and FIG. 10D is a schematic vertical downward view of the stirring rotor shown in FIG. 10**B.

(A) Polyol (polyethylene propylene ether triol having a number-average molecular weight of 3100, trade name: ACTCOLE EP-550N, manufactured by Mitsui Chemicals, Inc.): 100.0 parts.

(B) Conductive agent (trade name: SUNCONOL PEO-20R, manufactured by Sanko Chemical Industry Co., Ltd.): 1.0 part.

(C) Silicone foam stabilizer (trade name: SRX274C, manufactured by Dow Toray Co., Ltd.): 1.0 part.

(D) Tertiary amine catalyst A (mixture of bis(2-dimethylaminoethyl) ether and dipropylene glycol, trade name: TOYOCAT-ET, manufactured by Tosoh Corporation): 0.3 parts.

(E) Tertiary amine catalyst B (mixture of triethylenediamine and dipropylene glycol, trade name: TEDA-L33, manufactured by Tosoh Corporation): 0.2 parts.

(F) Particles (magnesium oxide, trade name: PYROKISUMA 5301, manufactured by Kyowa Chemical Industry Co., Ltd., average particle diameter 2 μm): 5 parts.

(G) Foaming agent (water): 1.4 parts.

(H) Isocyanate mixture (NCO %=45, MDI content=20%, trade name: COSMONATE TM20, manufactured by Mitsui Chemicals, Inc.): 24.4 parts.

Subsequently, the cylindrical member 22, the upper piece member 23, and the lower piece member 21 in a state of being combined together were kept in a state of being heated at 80° C. for 10 min, and the urethane rubber composition 25 was foamed and cured. After cooling to about 50° C., the upper piece member 23 and the lower piece member 21 were removed, and the metal core 24 having the foam layer formed on the outer peripheral surface thereof was demolded from the cylindrical member 22 to obtain a foam roller.

Next, the foam layer of the foam roller was subjected to surface treatment with ultraviolet rays to obtain an electrophotographic roller Y-1 according to Example 1.

For the surface treatment, a low-pressure mercury lamp (trade name: GLQ500US/11, manufactured by Harrison Toshiba Lighting Co., Ltd.) was used to uniformly irradiate the outer surface with ultraviolet rays while rotating the foam roller. The light quantity of UV light was 4000 $mJ/cm^2$ in terms of the sensitivity of a 254-nm sensor, and the processing time was 5 min.

The outer surface of the foam layer of the electrophotographic roller Y-1 and the inner wall of the cells open on the outer surface were subjected to elemental analysis by XPS (product name: VersaProbe II, manufactured by ULVAC- PHI, Inc.) to measure the amount of magnesium. The XPS measurement conditions were as follows. X-ray source: monochrome Al Kα, X-ray setting: 100 μmφ (25 W (15 KV)), photoelectron extraction angle: 45 degrees, neutralization conditions: combined use of neutralization gun and ion gun, analysis area: 100×100 $\mu m^2$, pass energy: 23.5 eV, step size: 0.1 eV.

For quantitative analysis of each element, peaks C1S (B.E. 280 to 294 eV), N1S (B.E. 392 to 406 eV), O1S (B.E. 526 to 538 eV), Mg2P (B.E. 44 to 60 eV), and Al2P (B.E. 68 to 84 eV) were used to determine the atomic % of each.

In the XPS analysis, the content ratio (atomic %) of metal elements with a Pauling electronegativity of 1.70 or less is calculated when the sum of all detected elements is 100 atomic %.

In addition, the measurement of the inner wall of the cell was performed by focusing X-rays on a part of the inner wall of the cell through the opening of the cell. The results are shown in Table 3. In Table 3, "S1" is the amount of the metal element based on the measurement on the outer surface of the foam layer, and "S2" is the amount of the metal element based on the measurement on the inner wall of the cell open to the outer surface of the foam layer.

Measurement of Point of Zero Charge

Step (i): Standard carriers (P-01, P-02, N-02, and N-01) distributed by the Imaging Society of Japan are prepared as the first to fourth reference powders, and N-01T distributed by the Imaging Society of Japan is prepared as a toner for standard carrier measurement.

The charge quantity test values of the first to fourth reference powders for the toner N-01T for standard carrier measurement are obtained by a blow-off method.

For the blow-off method, first, 9.5 g of standard carrier and 0.5 g of toner N-01T for standard carrier measurement are placed in a 50 mL polyethylene container and allowed to stand in an environment with a temperature of 23±2° C. and a relative humidity of 50±5% for 12 h. Next, the container is covered with a lid and shaken for 5 min at a swing angle of 30 degrees and a shaking speed of 150 times/min by using an arm-shaking mixer (model: YS-8D, manufactured by Yayoi Co., Ltd.). A total of 0.3 g of the mixture is placed on a metal mesh with an opening of 26 μm, and the toner N-01T is sucked at 2 MPa for 2 min by using a dust collector (model: VF-5N, manufactured by Amano Corporation).

At this time, the charge Q (μC) of the carriers remaining on the mesh is measured with a digital electrometer (model: 6514, manufactured by Keithley Instruments, LLC). Further, the charge quantity test value Q/M (μC/g) is calculated, where M (g) is the mass of the sucked toner.

The charge quantity test values of the standard carrier obtained by the blow-off method were −18.1 (μC/g), 18.8 (μC/g), and 26.5 (μC/g) and 44.7 (μC/g) in the order of P-02, P-01, N-02, and N-01, respectively.

Step (ii): The electrophotographic roller to be measured is allowed to stand in an environment with a temperature of 23.5° C. and a relative humidity of 50% for 24 h.

Figure 7:
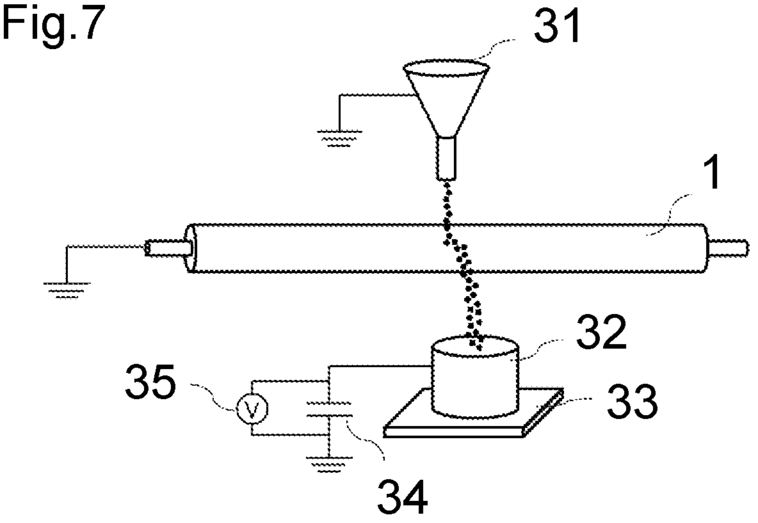
FIG. 7 illustrates a method for measuring a zero-point charge.

Step (iii): Under the same environment as in step (ii), as shown in FIG. 7, the electrophotographic roller 1 is placed with the rotation axis thereof horizontal, and 5 g of the standard carrier (P-01) is allowed to flow down from a funnel 31 having a leg with an inner diameter of 1.5 mm for 12 sec so that a point A (see FIG. 8B) on the peripheral surface of the electrophotographic roller is to be the center of drop. The point A will be described hereinbelow. In FIG. 7, reference numeral 34 indicates a capacitor, and reference numeral 35 indicates a voltmeter.

The entire amount of the standard carrier (P-01) that flowed down was recovered in a metallic recovery container 32 arranged below the electrophotographic roller, and the charge quantity Q (μC) of the recovered standard carrier (P-01) was measured using a cascade-type surface charge quantity measuring device (model number: TS-100, manufactured by Kyocera Chemical Co., Ltd.). An insulating plate 33 is provided below the recovery container 32.

Also, the recovery amount W (g) of the standard carrier (P-01) was obtained from the difference in mass of the recovery container 32 before and after the standard carrier (P-01) was recovered.

A value (Q (μC)/W (g)) obtained by dividing the charge quantity Q (μC) of the standard carrier (P-01) by the recovery amount W (g) is taken as a triboelectric charge quantity when the standard carrier (P-01) is used.

Figure 8A:
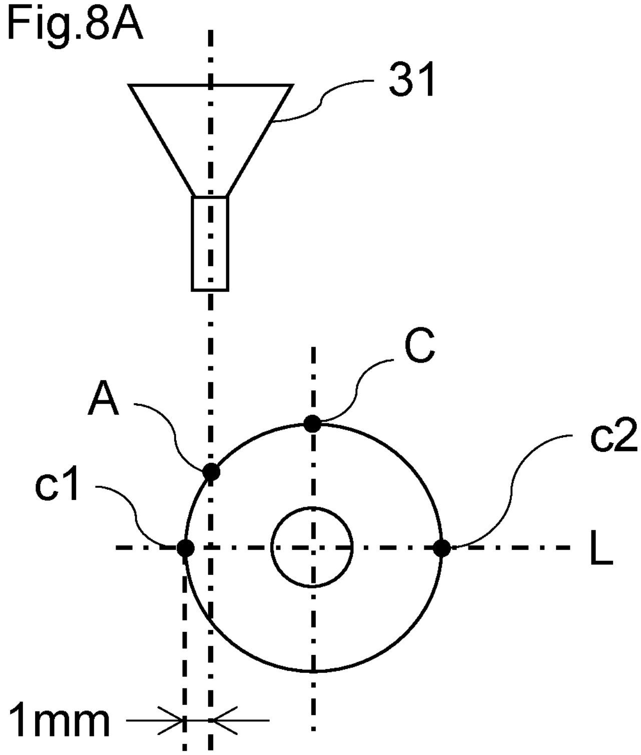
FIGS. 8A and 8B show the positional relationship when measuring the zero-point charge.
Figure 8B:
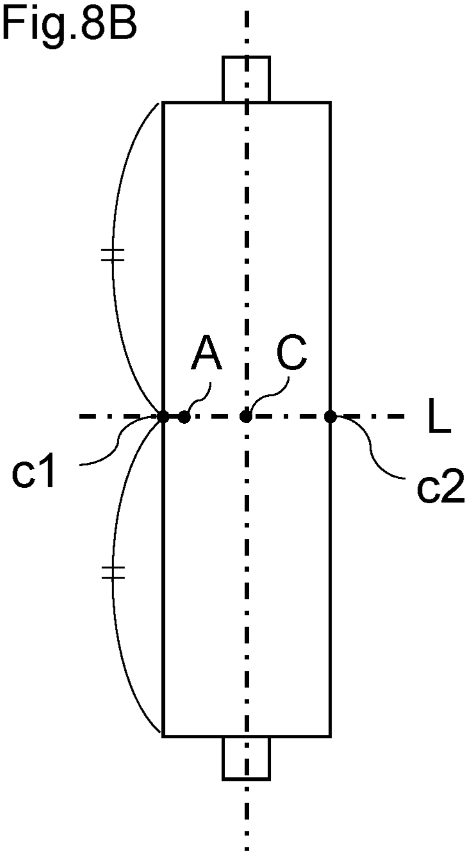

As shown in FIG. 8B, point A is as follows. FIG. 8B is a plan view of the electrophotographic roller taken vertically from above when the electrophotographic roller is placed so that the rotation axis thereof is horizontal. A line segment L passing through the midpoint C in the direction along the rotation axis of the electrophotographic roller and perpendicular to the direction along the rotation axis is drawn. The intersections of the line segment L and the ends of the electrophotographic roller in a plan view such as shown in FIG. 8B are denoted by point c1 and point c2. At this time, the point A is at a position 1 mm from the point c1 toward the point c2 on the line segment L in a plan view, this position being on the outer peripheral surface of the electrophotographic roller. When a cross-sectional view of the electrophotographic roller along the line segment L is viewed, the point A is represented as shown in FIG. 8A (in FIG. 8A, the line segment L is represented at the center of the roller for the sake of convenience).

Also, the height of the funnel 31 is adjusted so that the distance (distance in the vertical direction) between the tip of the leg of the funnel 31 and the point A is 15 mm.

Step (iv): After rotating the electrophotographic roller 90° counterclockwise, the triboelectric charge quantity of the standard carrier (P-02) is calculated in the same manner as in step (iii), except that the standard carrier (P-02) is used.

Step (v): After rotating the electrophotographic roller further 90° counterclockwise, the triboelectric charge quantity of the standard carrier (N-02) is calculated in the same manner as in step (iii), except that the standard carrier (N-02) is used.

Step (vi): After rotating the electrophotographic roller further 90° counterclockwise, the triboelectric charge quantity of the standard carrier (N-01) is calculated in the same manner as in step (iii), except that the standard carrier (N-01) is used.

Figure 9:
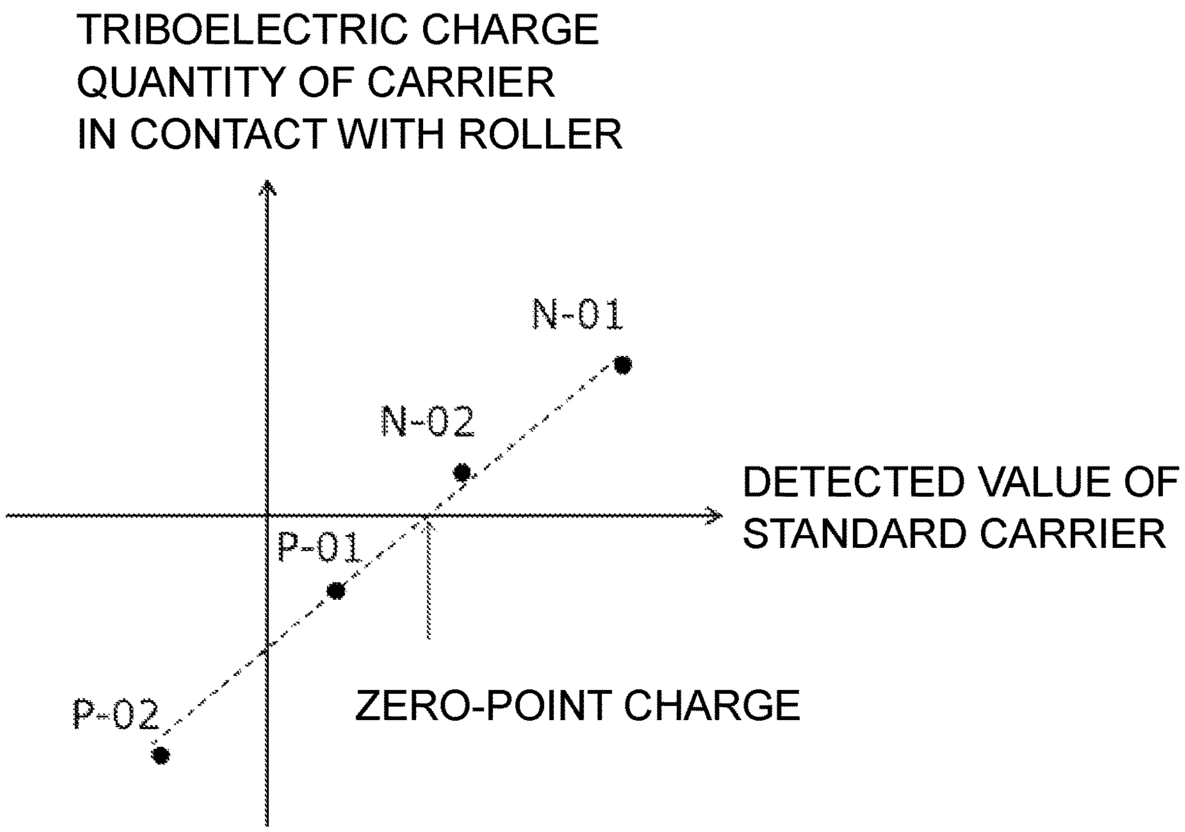
FIG. 9 illustrates a method for calculating the zero-point charge.

Step (vii): As shown in FIG. 9, in the X-Y plane graph, the charge quantity test value of the standard carrier (P-01) obtained in step (i) is plotted as the value on the X axis, and the triboelectric charge quantity obtained in step (iii) is plotted as a value on the Y axis.

Similarly, for standard carriers P-02, N-02, and N-01, the charge quantity test value of each standard carrier obtained in step (i) is plotted as the value on the X axis, and the triboelectric charge quantity of each standard carrier obtained in steps (iv) to (vi) is plotted as a value on the Y axis in the X-Y plane graph.

A regression line is drawn on the above four plots by the method of least squares, and the value of the intersection of the regression line and the X axis (the distance from the origin of the X-Y plane to the intersection) is taken as the zero-point charge of the electrophotographic roller. Since the charge order relative to the standard carrier does not change even if the temperature and humidity of the environment change, the zero-point charge does not change significantly.

Also, when measuring the zero-point charge of an electrophotographic roller to which the toner or the like has adhered, the measurement is performed after removing the adhered matter. The following method can be used as a method for removing the adhered matter.

First, air is blown on the electrophotographic roller to blow off the toner inside the foam structure. Further, the roller is ultrasonically cleaned in water using an ultrasonic cleaner and dried in an oven at 60° C. for 12 h. After that, the roller is observed with a scanning electron microscope (SEM) to confirm that the adhered matter is completely removed. Where complete removal is not achieved, ultrasonic cleaning and drying are repeated.

Talc Paper Fogging Image Evaluation

Talc paper fogging was evaluated using the electrophotographic roller to be evaluated as a toner supply roller.

First, a charging roller brush was removed from the cartridge of a laser printer (product name: HP LaserJet Pro M102w Printer, manufactured by Hewlett-Packard Company), and the cartridge was modified so that the toner supply roller could be mounted. The laser printer loaded with a toner supply roller to be evaluated was placed in a high-temperature and high-humidity environment (temperature: 32.5° C., relative humidity: 80%) and then allowed to stand for 12 h or more.

Next, 1000 black images with a print percentage of 1% were continuously output on a predetermined number of sheets of talc-containing paper (trade name: Century Star paper, manufactured by Century Paper). At this time, the reflectance (referred to as R1 (%)) at a position 5 mm from the edge of the 1000th image was measured with a reflection densitometer (trade name: TC-6DS/A, manufactured by Tokyo Denshoku Co., Ltd). In addition, the reflectance of unprinted paper (referred to as R2 (%)) was also measured in the same manner as a comparison target for the reflectance, and the value obtained by subtracting R1 (%) from R2 (%) was taken as the talc paper fogging value (%).

Then, in the middle of outputting a solid white image, the power to the color laser printer was turned off and the process cartridge was taken out. Next, the charge quantity Q/M per unit mass of the toner on the toner carrying member was measured by a suction method. For the measurement of Q/M by the suction method, a measurement container having a cylindrical filter paper (trade name: cylindrical filter paper No. 86R, manufactured by Advantec Co., Ltd.) is used, a metallic suction port following the shape of the toner carrying member surface is attached, a suction pressure is adjusted so that the toner on the surface of the toner carrying member immediately after the image formation could be uniformly sucked without excess or deficiency, and the toner is sucked. Then, the charge Q (mC) of the toner sucked in at this time is measured with a digital electrometer (model: 8252, manufactured by ADC Corporation), and Q/M (mC/kg) is calculated with M (kg) being the mass.

Examples 2 to 9

Electrophotographic rollers Y-2 to Y-9 according to Examples 2 to 9 were produced in the same manner as in Example 1, except that the type and amount of particles (F) were changed as shown in Table 1, and the evaluation was performed in the same manner as in Example 1.

Example 10

An electrophotographic roller Y-10 according to Example 8 was produced in the same manner as in Example 1, except that the type of polyol (A) was changed to a polyester polyol (I) having a number average molecular weight of 1000 (trade name: Kuraray Polyol P-1020, manufactured by Kuraray Co., Ltd.) and the amount of the isocyanate mixture (H) was changed to 31.7 parts, and the evaluation was performed in the same manner as in Example 1.

Example 11

An electrophotographic roller Y-11 according to Example 11 was produced in the same manner as in Example 1, except that the surface treatment time with ultraviolet rays was changed as shown in Table 1. As a result of elemental analysis of the cell inner wall of the electrophotographic roller by XPS, the content of magnesium was 0.4 atomic %. The evaluation was then performed in the same manner as in Example 1.

Example 12

Under an argon atmosphere, 22.9 g of methyl methacrylate, 20.0 g of dimethylaminoethyloctyl bromide methacrylate salt, and 1.0 g of benzoyl peroxide were dissolved in 85 g of ethanol and reacted at 80° C. for 4 h. After that, the mixture was heated in an open system to volatilize the ethanol, thereby obtaining a random copolymer.

A total of 2 parts of the random copolymer was added instead of the particles (F), and uniform dissolution in the liquid B was confirmed. Thereafter, an electrophotographic roller Y-12 according to Example 12 was produced in the same manner as in Example 1, except that the surface treatment with ultraviolet light was not performed, and the evaluation was performed in the same manner as in Example 1.

Table 1 shows the formulation of each electrophotographic roller obtained.

TABLE 1

| Roller No. | (A) parts by mass | (F) type | (F) X | (F) average particle diameter (μm) | (F) parts by mass | (H) parts by mass | (I) parts by mass | UV processing time min |
|---|---|---|---|---|---|---|---|---|
| Y-1 | 100 | MgO | 1.31 | 2.0 | 5 | 24.4 | 0 | 5 |
| Y-2 | 100 | $Mg_{0.68}Al_{0.32}(OH)_2(CO_3)_{0.16}\cdot 0.57H_2O$ | 1.41 | 0.5 | 5 | 24.4 | 0 | 5 |

TABLE 1-continued

| Roller No. | (A) parts by mass | (F) type | X | average particle diameter (μm) | parts by mass | (H) parts by mass | (I) parts by mass | UV processing time min |
|---|---|---|---|---|---|---|---|---|
| Y-3 | 100 | $MgAl_2O_4$ | 1.51 | 0.4 | 5 | 24.4 | 0 | 5 |
| Y-4 | 100 | $LiAl_2(OH)_6(PHO_2)_{0.5}$•$0.57H_2O$ | 1.40 | 0.6 | 5 | 24.4 | 0 | 5 |
| Y-5 | 100 | $Mg_{0.75}Al_{0.25}(OH)_2(CO_3)_{0.13}$•$0.5H_2O$ | 1.39 | 20 | 5 | 24.4 | 0 | 5 |
| Y-6 | 100 | $Al_2O_3$ | 1.61 | 1.4 | 5 | 24.4 | 0 | 5 |
| Y-7 | 100 | ZnO | 1.65 | 0.6 | 5 | 24.4 | 0 | 5 |
| Y-8 | 100 | MgO | 1.31 | 2.0 | 10 | 24.4 | 0 | 5 |
| Y-9 | 100 | MgO | 1.31 | 2.0 | 2 | 24.4 | 0 | 5 |
| Y-10 | 0 | MgO | 1.31 | 2.0 | 5 | 31.7 | 100 | 5 |
| Y-11 | 100 | MgO | 1.31 | 2.0 | 5 | 24.4 | 0 | 1 |
| Y-12 | 100 | — | — | — | — | 24.4 | 0 | 0 |
| X-1 | 100 | — | — | — | — | 24.4 | 0 | 5 |
| X-2 | 100 | MgO | 1.31 | 2.0 | 5 | 24.4 | 0 | 0 |
| X-3 | 100 | SiO2 | 1.90 | 0.8 | 5 | 24.4 | 0 | 5 |
| X-8 | 100 | — | — | — | — | 24.4 | 0 | 0 |
| X-9 | 100 | — | — | — | — | 24.4 | 0 | 0 |
| X-10 | 100 | — | — | — | — | 24.4 | 0 | 0 |

Example 13

Preparation of Unvulcanized Rubber Composition

A vulcanizing aid and particles were added to the unvulcanized rubber below, and kneading was performed for 7 min at a rotor speed of 30 rpm by using a 7-liter closed kneader (trade name: WDS7-30: manufactured by Nihon Spindle Manufacturing Co., Ltd. (former: Moriyama Co., Ltd.)).

Unvulcanized Rubber (J) Acrylonitrile butadiene rubber (NIPOL DN401LL, manufactured by Nippon Zeon Co., Ltd.): 68 parts.

(K) Epichlorohydrin/ethylene oxide/allyl glycidyl ether terpolymer containing 56.7% by mass of ethylene oxide (EPION301, manufactured by Osaka Soda Co., Ltd.): 22 parts.

(L) Epichlorohydrin/ethylene oxide/allyl glycidyl ether terpolymer containing 37.2% by mass of ethylene oxide (EPICHLOMER CG102, manufactured by Osaka Soda Co., Ltd.): 10 parts

Vulcanizing Aid (M) Zinc stearate (zinc stearate, manufactured by NOF Corporation): 3.0 parts.

(N) Stearic acid (stearic acid camellia, manufactured by NOF Corporation): 1.0 part.

Particles (F) Magnesium oxide (trade name: PYROKISUMA 5301, manufactured by Kyowa Chemical Industry Co., Ltd.): 5 parts.

After kneading, a foaming agent, a vulcanizing agent and a vulcanization accelerator were added, and the mixture was kneaded and dispersed for 15 min using a 12-inch open roll (Kansai Roll Co., Ltd.) while cooling to maintain the temperature of the unvulcanized rubber composition at 80° C. or less. Finally, the mixture was shaped into a ribbon and taken out, and an unvulcanized rubber composition for forming a conductive foam was thus prepared.

Vulcanizing Agent (O) Sulfur (SULFAX PMC, manufactured by Tsurumi Chemical Co., Ltd.): 3.0 parts.

Vulcanization Accelerator (P) Tetraethylthiuram disulfide (NOCCELLER TET-G, manufactured by Ouchi Shinko Chemical Industrial Co., Ltd.): 2.0 parts.

(Q) Dibenzothiazyl disulfide (NOCCELLER DM-P, manufactured by Ouchi Shinko Chemical Industrial Co., Ltd.): 1.5 parts.

Foaming Agent (R) 4,4'-Oxybis(benzenesulfonylhydrazide) OBSH with a median diameter of 5.0 μm (NEOCELLBORN N #1000M, manufactured by Eiwa Chemical Ind. Co., Ltd.): 2.0 parts.

(S) OBSH with a median diameter of 16.0 μm (NEOCELLBORN N#1000S, manufactured by Eiwa Chemical Ind. Co., Ltd.): 0.5 parts.

Production of Electrophotographic Roller

The ribbon-shaped unvulcanized rubber composition for the conductive foam was extruded into a tube by an extruder (60 mm vent type rubber extruder, manufactured by Mitsuba Mfg. Co., Ltd.). Then, the tube was vulcanized and foamed by a vulcanizing device (manufactured by Micro Denshi Co., Ltd.) including a 3.0 kW microwave vulcanizer to prepare a rubber tube.

The microwave vulcanizer was set to a frequency of 2450±50 MHz and an output of 0.6 kW, and the furnace temperature was set to 180° C. After vulcanization and foaming in the microwave vulcanizer, further vulcanization and foaming were performed in a hot air vulcanizer with a furnace temperature set to 200° C.

The outer diameter of the tube after vulcanization and foaming was about 14.0 mm, and the inner diameter was about 3.0 mm. The time required to pass through the microwave vulcanizer was about 2 min, the time required to pass through the hot air vulcanizer was about 3 min, and the time required to pass through the take-up machine was about 30 sec.

After vulcanization and foaming, the rubber tube was cut using a standard-length cutting machine, a mandrel having an outer diameter of 4 mm was press-fitted into the rubber tube, both ends were cut, and a roller having a rubber layer with a length of 220 mm was obtained. The outer peripheral surface of the roller was polished at a rotational speed of 1800 rpm and a feed rate of 800 mm/min so that the outer diameter was 11 mm. Next, under the same conditions as in Example 1, the foam layer of the foam roller was subjected to surface treatment with ultraviolet rays to prepare an electrophotographic roller Z-1 according to Example 13. Furthermore, the electrophotographic roller Z-1 according to Example 13 was evaluated in the same manner as in Example 1.

Examples 14 to 16

Electrophotographic rollers Z-2 to Z-4 according to Examples 14 to 16 were produced in the same manner as in Example 13, except that the type of particles (F) were changed as shown in Table 2, and the evaluation was performed in the same manner as in Example 1.

TABLE 2

| | (G) | | | | |
|---|---|---|---|---|---|
| Roller No. | type | X | average particle diameter (μm) | parts by mass | UV processing time min |
| Z-1 | MgO | 1.31 | 2.0 | 5.0 | 5 |
| Z-2 | $Mg_{0.68}Al_{0.32}(OH)_2(CO_3)_{0.16}$•$0.57H_2O$ | 1.41 | 0.5 | 5.0 | 5 |
| Z-3 | $MgAl_2O_4$ | 1.51 | 0.4 | 5.0 | 5 |
| Z-4 | $LiAl_2(OH)_6(PHO_2)_{0.5}$•$0.57H_2O$ | 1.40 | 0.6 | 5.0 | 5 |
| X-4 | $Mg_{0.68}Al_{0.32}(OH)_2(CO_3)_{0.16}$•$0.57H_2O$ | 1.41 | 0.5 | 5.0 | 0 |

Comparative Example 1

An electrophotographic roller X-1 was produced in the same manner as in Example 1, except that the particles (F) were not added, and the evaluation was performed in the same manner as in Example 1.

Comparative Example 2

An electrophotographic roller X-2 was produced in the same manner as in Example 1, except that the surface treatment with ultraviolet rays was not performed. As a result of elemental analysis of the cell inner wall of the electrophotographic roller by XPS, the content of magnesium was 0.2 atomic %. Furthermore, evaluation was performed in the same manner as in Example 1.

Comparative Example 3

An electrophotographic roller X-3 was produced in the same manner as in Example 1, except that the type of particles (F) was changed to silica (MSN-002, manufactured by Tayca Co., Ltd.), and the evaluation was performed in the same manner as in Example 1.

Comparative Example 4

An electrophotographic roller X-4 was produced in the same manner as in Example 14, except that the surface treatment with ultraviolet light was not performed, and the evaluation was performed in the same manner as in Example 1.

Comparative Example 5

A total of 3 parts of nylon (TORESIN EF-30T, manufactured by Teikoku Chemical Industry Co., Ltd.) and 0.15 parts of a hydrotalcite compound ($Mg_{0.68}Al_{0.32}(OH)_2(CO_3)_{0.16}\cdot 0.57H_2O$, trade name: KYOWARD 500, manufactured by Kyowa Chemical Industry Co., Ltd.) were blended with 100 parts of heated methanol and mixed until the nylon was completely dissolved to prepare a nylon solution.

An electrophotographic roller X-5 according to Comparative Example 5 was produced by spray-coating the nylon solution while rotating the roller of Comparative Example 1 and drying at 120° C. for 30 min. As a result of elemental analysis of the cell inner wall of the electrophotographic roller by XPS, the content of magnesium was 0.1 atomic % and the content of aluminum was 0.0 atomic %. Furthermore, the electrophotographic roller X-5 was evaluated in the same manner as in Example 1.

Example 17

The electrophotographic roller X-5 according to Comparative Example 5 was subjected to a surface treatment with ultraviolet light for 5 min in the same manner as in Example 1 to produce an electrophotographic roller Y-13 according to Example 17. As a result of elemental analysis of the cell inner wall of the electrophotographic roller by XPS, the content of magnesium was 0.6 atomic % and the content of aluminum was 0.2 atomic %. Furthermore, the electrophotographic roller Y-13 was evaluated in the same manner as in Example 1.

Comparative Example 6

A mandrel with an outer diameter of 4 mm was press-fitted into a silicone sponge (model number: RBWSS12, manufactured by Misumi Group Inc.), both ends were cut to obtain a roller having a rubber layer with a length of 220 mm. The outer peripheral surface of the roller was polished at a rotation speed of 1800 rpm and a feed rate of 800 mm/min so that the outer diameter was 11 mm, and an electrophotographic roller X-6 according to Comparative Example 6 was produced. Furthermore, the electrophotographic roller X-6 was evaluated in the same manner as in Example 1.

Comparative Example 7

A hydrotalcite compound ($Mg_{0.75}Al_{0.25}(OH)_2(CO_3)_{0.13}\cdot0.5H_2O$, trade name: DHT-4A, manufactured by Kyowa Chemical Industry Co., Ltd.) was spread as evenly as possible on a flat surface in advance. The electrophotographic roller X-1 according to Comparative Example 1 was then rotated several times to sufficiently apply the hydrotalcite compound, and excess particles were blown off with air to prepare an electrophotographic roller X-7 of Comparative Example 7. The adhered amount of particles was 72 mg. Furthermore, the electrophotographic roller X-7 was evaluated in the same manner as in Example 1.

Comparative Example 8

Under an argon atmosphere, 22.9 g of methyl methacrylate, 9.0 g of dimethylaminoethyl methacrylate, and 1.0 g of benzoyl peroxide were dissolved in 85 g of ethanol and reacted at 80° C. for 4 h. After that, the mixture was heated in an open system to volatilize the ethanol to obtain a random copolymer.

A total of 2 parts of the random copolymer was added instead of the particles (F), and uniform dissolution in the liquid B was confirmed. Thereafter, an electrophotographic roller X-8 according to Comparative Example 8 was produced in the same manner as in Example 1, except that the surface treatment with ultraviolet rays was not performed, and the evaluation was performed in the same manner as in Example 1.

Comparative Example 9

A total of 2 parts of trimethyloctylammonium bromide was added instead of the particles (F), and uniform dissolution in the liquid B was confirmed. Thereafter, an electrophotographic roller X-9 according to Comparative Example 9 was produced in the same manner as in Example 1, except that the surface treatment with ultraviolet rays was not performed, and the evaluation was performed in the same manner as in Example 1.

Comparative Example 10

A roller with an outer diameter of 13 mm was obtained by molding the same urethane rubber composition as in Example 12 by using a cylindrical member with an inner diameter of 13 mm. The outer peripheral surface of the roller was polished at a rotation speed of 1800 rpm and a feed rate of 800 mm/min so that the outer diameter was 11 mm, and an electrophotographic roller X-10 according to Comparative Example 10 was produced. Furthermore, the electrophotographic roller X-10 was evaluated in the same manner as in Example 1.

TABLE 3

| | Roller No. | zero-point charge (μC/g) | S1 (atomic %) | S2 (atomic %) | Q/M (mC/kg) | Talc paper fogging (%) |
|---|---|---|---|---|---|---|
| Example 1 | Y-1 | 62 | 1.5 | 1.4 | −22.3 | 1.2 |
| Example 2 | Y-2 | 51 | 1.0 | 0.9 | −19.6 | 3.4 |
| Example 3 | Y-3 | 48 | 1.2 | 1.1 | −17.7 | 4.3 |
| Example 4 | Y-4 | 53 | 1.0 | 0.9 | −20.6 | 2.2 |
| Example 5 | Y-5 | 55 | 1.0 | 0.9 | −21.6 | 1.8 |
| Example 6 | Y-6 | 45 | 1.4 | 1.3 | −16.5 | 5.3 |
| Example 7 | Y-7 | 44 | 1.5 | 1.4 | −15.4 | 5.9 |
| Example 8 | Y-8 | 65 | 1.7 | 1.6 | −22.5 | 1.1 |
| Example 9 | Y-9 | 43 | 0.6 | 0.6 | −14.9 | 6.3 |
| Example 10 | Y-10 | 60 | 1.4 | 1.3 | −21.9 | 1.5 |
| Example 11 | Y-11 | 40 | 0.4 | 0.4 | −12.9 | 7.5 |
| Example 12 | Y-12 | 42 | — | — | −13.8 | 6.8 |
| Example 13 | Z-1 | 55 | 1.2 | 1.1 | −21.3 | 1.9 |
| Example 14 | Z-2 | 44 | 0.8 | 0.7 | −15.9 | 5.8 |
| Example 15 | Z-3 | 45 | 0.7 | 0.7 | −16.1 | 5.7 |
| Example 16 | Z-4 | 40 | 0.9 | 0.8 | −12.8 | 7.6 |
| Example 17 | Y-13 | 50 | 0.9 | 0.8 | −18.7 | 3.9 |
| Comparative Example 1 | X-1 | 34 | — | — | −9.8 | 9.9 |
| Comparative Example 2 | X-2 | 36 | 0.2 | 0.2 | −10.3 | 9.6 |
| Comparative Example 3 | X-3 | 32 | — | — | −9.5 | 10.1 |
| Comparative Example 4 | X-4 | 37 | 0.5 | 0.3 | −10.5 | 9.3 |
| Comparative Example 5 | X-5 | 35 | 0.1 | 0.1 | −10.1 | 9.8 |
| Comparative Example 6 | X-6 | 31 | — | — | −8.9 | 10.5 |
| Comparative Example 7 | X-7 | — | — | — | −9.3 | 10.1 |
| Comparative Example 8 | X-8 | 38 | — | — | −11.0 | 8.9 |
| Comparative Example 9 | X-9 | 37 | — | — | −10.4 | 9.4 |
| Comparative Example 10 | X-10 | 37 | — | — | −10.5 | 9.2 |

In the table, S1 is the total content ratio (atomic %) of metal elements having a Pauling electronegativity of 1.70 or less, which is measured by X-ray photoelectron spectroscopy of the outer surface of the foam layer. S2 indicates the total content ratio (atomic %) of metal elements having a Pauling electronegativity of 1.70 or less, which is measured by X-ray photoelectron spectroscopy of the inner wall of the cell open on the outer surface of the electrophotographic roller.

In Examples 1 to 17, since the zero-point charge is 40 μC/g or more, the effect of recovering talc is large, and the charge quantity Q/M per unit mass on the toner carrying member has a negative value and a large absolute value. Therefore, a good effect of preventing talc paper fogging was obtained.

Among them, Examples 1 to 8, Example 10, Examples 13 to 15, and Example 17 had a zero-point charge of 44 μC/g or more, so it was confirmed that they tended to exhibit better resistance to talc paper fogging.

In addition, Examples 1, 5, 8, 10, and 13 had a zero-point charge of 55 μC/g or more, so it was confirmed that they tended to exhibit particularly good resistance to talc paper fogging.

In addition, Examples 1 to 4 exhibited a low zero-point charge due to the effect of a lone pair of electrons derived from the urethane group. As a result, talc paper fogging could be prevented more effectively than in Examples 13 to 16, in which the particles of the same type were used in the same amount.

Comparative Examples 1 to 6 and Comparative Examples 8 to 10 had a zero-point charge of less than 40 μC/g. From this, it is considered that the charge quantity Q/M per unit mass on the toner carrying member had a negative value and a small absolute value, and the talc paper fogging occurred.

Also, Comparative Example 2 used the same type and amount of particles as in Example 1, but no treatment with ultraviolet rays was performed. Therefore, the particles were not exposed from the inner wall of the cells, and the zero-point charge showed a value of less than 40 μC/g. As a result, it is considered that the charge quantity Q/M per unit mass on the toner carrying member had a negative value and a small absolute value, and the talc paper fogging occurred.

Furthermore, Comparative Example 10 used the same type and amount of random copolymer as in Example 12. However, the polishing treatment reduced the abundance of random copolymer on the outer peripheral surface of the foam layer, and the zero-point charge showed a value of less than 40 μC/g. As a result, it is considered that the charge quantity Q/M per unit mass on the toner carrying member had a negative value and a small absolute value, and the talc paper fogging occurred.

In Comparative Example 7, since the particles are only physically adhered to the foam layer, the particles are released during running and the talc on the toner carrying member cannot be recovered. Therefore, talc paper fogging is likely to occur.

After the evaluation, the electrophotographic roller X-7 was removed from the cartridge, the toner was removed, and the zero-point charge was measured to be 34 μC/g. The toner removal operation was performed by the following method.

First, air was blown onto the electrophotographic roller to blow off the toner inside the foam structure. Further, the roller was subjected to ultrasonic cleaning in water by using an ultrasonic cleaner and dried in an oven at 60° C. for 12 h.

Example 18

The charging roller brush was removed from the cartridge of the laser printer (product name: HP LaserJet Pro M102w Printer, manufactured by Hewlett-Packard Company). Furthermore, modification was performed such that the electrophotographic roller Y-1 could be attached as a cleaning roller that rotates in contact with the photosensitive member. The talc paper fogging value and the charge quantity Q/M per unit mass on the developer carrier were calculated in the same manner as in Example 1.

Example 19, Comparative Example 11

The evaluation was performed in the same manner as in Example 18, except that the type of electrophotographic roller was changed as shown in Table 4.

TABLE 4

| | Roller No. | zero-point charge (μC/g) | Q/M (mC/kg) | Talc paper fogging (%) |
|---|---|---|---|---|
| Example 18 | Y-1 | 62 | −22.0 | 1.5 |
| Example 19 | Y-5 | 55 | −21.1 | 2.0 |
| Comparative Example 11 | X-1 | 34 | −9.2 | 10.5 |

In Examples 18 and 19, since the zero-point charge was 40 μC/g or more, the talc on the photosensitive member could be recovered and the adhesion of talc on the toner carrying member could be suppressed. Therefore, a good effect of preventing talc paper fogging was obtained.

In Comparative Example 11, the talc on the photosensitive member could not be recovered because the zero-point charge was less than 40 μC/g. As a result, talc adheres to the toner carrying member, and talc paper fogging is likely to occur.

This disclosure relates to following constitutions.

Constitution 1

An electrophotographic roller comprising a substrate and a foam layer on an outer peripheral surface of the substrate, the foam layer constituting an outer surface of the electrophotographic roller, the foam layer comprising a plurality of cells open on an outer surface, and the foam layer having a zero-point charge measured using a standard carrier of 40 μC/g or more.

Constitution 2

The electrophotographic roller according to constitution 1, wherein the foam layer comprises particles each of which is at least partially exposed from an inner wall of the cells, the particles comprising a compound containing at least one metal element, the metal element having a Pauling electronegativity of 1.70 or less.

Constitution 3

The electrophotographic roller according to constitution 2, wherein the particles comprise a hydrotalcite compound represented by a following formula (1):

$$Mg_{(1-x)}Al_x(OH)_2(CO_3)_{x/2}\cdot mH_2O \quad (1)$$

(in the formula (1), x satisfies $0.00<x\leq 0.50$, m is a positive number).

Constitution 4

The electrophotographic roller according to constitution 2, wherein the particles comprise magnesium oxide.

Constitution 5

The electrophotographic roller according to any one of constitutions 2 to 4, wherein a total content ratio S1 of the metal elements having the Pauling electronegativity of 1.70 or less, which is measured by X-ray photoelectron spectroscopy of the outer surface of the foam layer, is 0.4 atomic % or more.

Constitution 6

The electrophotographic roller according to any one of constitutions 2 to 4, wherein a total content ratio S2 of the metal elements having the Pauling electronegativity of 1.70 or less, which is measured by X-ray photoelectron spectroscopy of the inner walls of the cells of the foam layer, is 0.4 atomic % or more.

Constitution 7

The electrophotographic roller according to any one of constitutions 1 to 4, wherein the foam layer comprises a polyurethane as a binder resin.

Constitution 8

A process cartridge configured to be detachable to a main body of an electrophotographic image forming apparatus, comprising the electrophotographic roller according to any one of constitutions 1 to 4.

Constitution 9

The process cartridge according to constitution 8, further comprising a photosensitive member and a toner carrying member that transports a toner onto a surface of the photosensitive member, and the electrophotographic roller is at least one selected from the group consisting of a toner supply roller that supplies the toner to a surface of the toner carrying member and a cleaning roller that cleans the photosensitive member.

Constitution 10

An electrophotographic image forming apparatus comprising the electrophotographic roller according to any one of constitutions 1 to 4.

Constitution 11

The electrophotographic image forming apparatus according to constitution 10, further comprising:

a photosensitive member;

a toner carrying member that carries a toner onto a surface of the photosensitive member;

a toner supply roller that supplies the toner to a surface of the toner carrying member, and a cleaning roller that cleans the photosensitive member, wherein the electrophotographic roller is at least one selected from the group consisting of the toner supply roller and the cleaning roller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-067493, filed Apr. 15, 2022, which is hereby incorporated by reference herein in its entirety.

What is claimed is:

1. An electrophotographic roller comprising a substrate and a foam layer on an outer peripheral surface of the substrate, the foam layer constituting an outer surface of the electrophotographic roller, the foam layer comprising cells each of which opens on the outer surface, and the foam layer having a zero-point charge measured using a standard carrier of 40 μC/g or more.

2. The electrophotographic roller according to claim 1, wherein the foam layer comprises particles each of which is at least partially exposed from an inner wall of the cells, the particles comprise a compound containing at least one metal element, and the metal element has a Pauling electronegativity of 1.70 or less.

3. The electrophotographic roller according to claim 2, wherein the particles comprises a hydrotalcite compound represented by a following formula (1):

$$Mg_{(1-x)}Al_x(OH)_2(CO_3)_{x/2}\cdot mH_2O \qquad (1)$$

(in the formula (1), x satisfies $0.00<x\leq0.50$, m is a positive number).

4. The electrophotographic roller according to claim 2, wherein the particles comprise magnesium oxide.

5. The electrophotographic roller according to claim 2, wherein a total content ratio S1 of the metal elements having the Pauling electronegativity of 1.70 or less, which is measured by X-ray photoelectron spectroscopy of the outer surface of the foam layer, is 0.4 atomic % or more.

6. The electrophotographic roller according to claim 2, wherein a total content ratio S2 of the metal elements having the Pauling electronegativity of 1.70 or less, which is measured by X-ray photoelectron spectroscopy of the inner walls of the cells of the foam layer, is 0.4 atomic % or more.

7. The electrophotographic roller according to claim 1, wherein the foam layer comprises a polyurethane as a binder resin.

8. A process cartridge configured to be detachable to a main body of an electrophotographic image forming apparatus, comprising an electrophotographic roller, the electrophotographic roller comprising a substrate and a foam layer on an outer peripheral surface of the substrate, the foam layer constituting an outer surface of the electrophotographic roller, the foam layer comprising cells open on the outer surface, and the foam layer having a zero-point charge measured using a standard carrier of 40 μC/g or more.

9. The process cartridge according to claim 8, further comprising a photosensitive member and a toner carrying member that transports a toner onto a surface of the photosensitive member, wherein the electrophotographic roller is at least one selected from the group consisting of a toner supply roller that supplies the toner to a surface of the toner carrying member; and a cleaning roller that cleans the photosensitive member.

10. An electrophotographic imaging apparatus comprising an electrophotographic roller, the electrophotographic roller comprising a substrate and a foam layer on an outer peripheral surface of the substrate, the foam layer constituting an outer surface of the electrophotographic roller the foam layer comprising cells open on the outer surface, and the foam layer having a zero-point charge measured using a standard carrier of 40 μC/g or more.

11. The electrophotographic image forming apparatus according to claim 10, further comprising:

a photosensitive member;

a toner carrying member that carries a toner onto a surface of the photosensitive member;

a toner supply roller that supplies the toner to a surface of the toner carrying member, and a cleaning roller that cleans the photosensitive member, wherein the electrophotographic roller is at least one selected from the group consisting of the toner supply roller and the cleaning roller.

* * * * *